US008368936B2

(12) United States Patent
Teramoto et al.

(10) Patent No.: US 8,368,936 B2
(45) Date of Patent: Feb. 5, 2013

(54) CONFERENCE SYSTEM AND IMAGE DATA MANAGEMENT METHOD

(75) Inventors: Keisuke Teramoto, Itami (JP); Atsushi Ohshima, Amagasaki (JP); Masami Yamada, Sennan-gun (JP)

(73) Assignee: Konica Minolta Business Technologies, Inc, Tokyo (JP)

( * ) Notice: Subject to any disclaimer, the term of this patent is extended or adjusted under 35 U.S.C. 154(b) by 511 days.

(21) Appl. No.: 12/726,911

(22) Filed: Mar. 18, 2010

(65) Prior Publication Data
US 2010/0238500 A1     Sep. 23, 2010

(30) Foreign Application Priority Data
Mar. 18, 2009 (JP) ................................ 2009-067061

(51) Int. Cl.
*G06F 15/00* (2006.01)
(52) U.S. Cl. ........ 358/1.15; 358/2.1; 358/296; 345/173; 345/213; 709/203; 709/220
(58) Field of Classification Search ................. 358/1.15, 358/2.1, 296, 462; 345/173, 213, 501; 709/203, 709/220
See application file for complete search history.

(56) References Cited

U.S. PATENT DOCUMENTS

| 5,181,129 | A * | 1/1993 | Sato et al. ................... 358/494 |
| 5,894,305 | A * | 4/1999 | Needham .................... 715/733 |
| 6,286,034 | B1 | 9/2001 | Sato et al. |
| 7,634,533 | B2 * | 12/2009 | Rudolph et al. ............. 709/203 |
| 2004/0264811 | A1 * | 12/2004 | Yano et al. .................. 382/306 |
| 2007/0106950 | A1 * | 5/2007 | Hutchinson et al. ......... 715/761 |
| 2007/0143402 | A1 * | 6/2007 | Kumagai ..................... 709/204 |
| 2009/0044251 | A1 | 2/2009 | Otake et al. |

FOREIGN PATENT DOCUMENTS

| JP | 9-214618 | 8/1997 |
| JP | 2000-49992 | 2/2000 |
| JP | 2000-56747 | 2/2000 |
| JP | 2000-165577 | 6/2000 |
| JP | 2003-229987 | 8/2003 |
| JP | 2004-38886 | 2/2004 |
| JP | 2004-274518 | 9/2004 |

(Continued)

OTHER PUBLICATIONS

Japanese Notice of Ground of Rejection mailed Nov. 24, 2010, directed to Japanese Patent Application No. 2009-067061; 10 pages.

*Primary Examiner* — King Poon
*Assistant Examiner* — Allen H Nguyen
(74) *Attorney, Agent, or Firm* — Morrison & Foerster LLP

(57) ABSTRACT

In order to facilitate printing of an image drawn on an electronic board while improving security, an MFP includes a portion to generate conference identification information in response to reception of a start instruction from an electronic board, a portion to associate the conference identification information with device identification information for the electronic board, a portion to associate image data received from the electronic board with conference identification information lastly associated with the device identification information for the electronic board, a portion to associate user identification information received from the electronic board with conference identification information lastly associated with the device identification information for the electronic board, a portion to authenticate a user, a portion to extract conference identification information associated with the user identification information for the authenticated user, a portion to extract image data associated with the conference identification information, and a portion to output the image data.

20 Claims, 15 Drawing Sheets

FOREIGN PATENT DOCUMENTS

| | | |
|---|---|---|
| JP | 2005-56332 | 3/2005 |
| JP | 2005-197796 | 7/2005 |
| JP | 2006-106890 | 4/2006 |
| JP | 3842782 | 8/2006 |
| JP | 2007-158601 | 6/2007 |
| JP | 2009-42964 | 2/2009 |

* cited by examiner

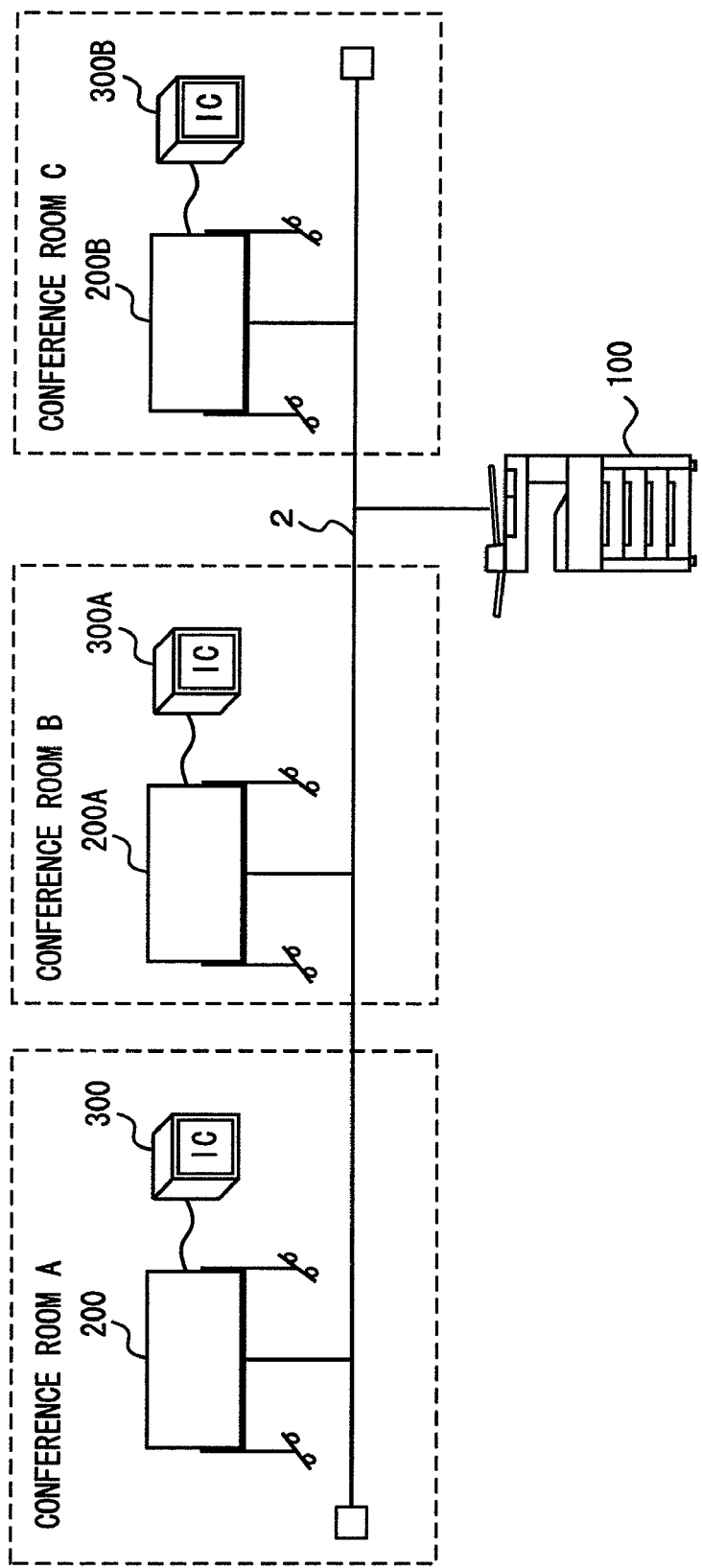

F I G. 6
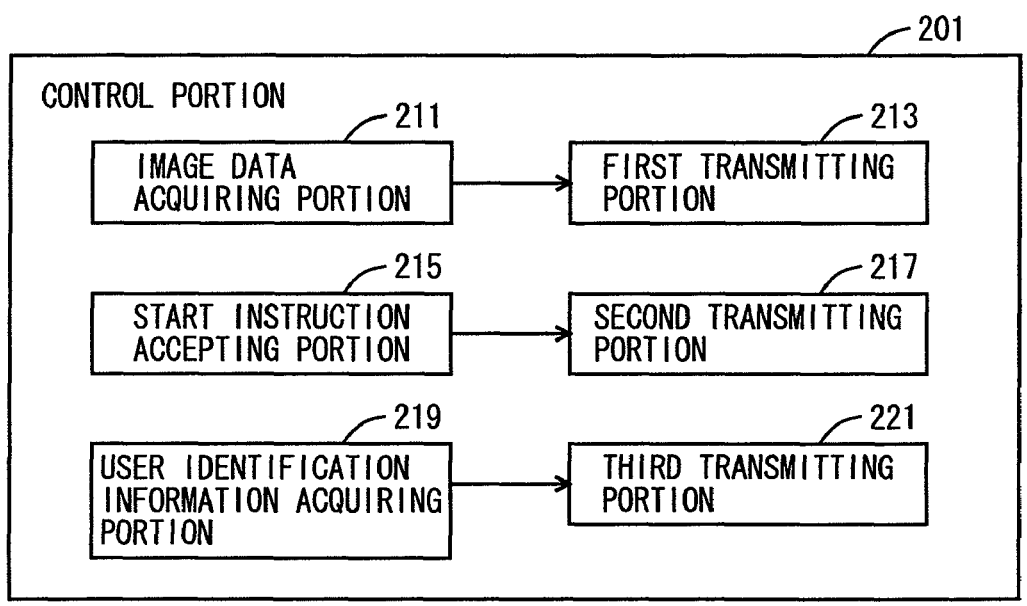

CONFERENCE TABLE      91

| CONFERENCE IDENTIFICATION INFORMATION | DEVICE IDENTIFICATION INFORMATION | CONFERENCE FLAG |
|---|---|---|

IMAGE DATA TABLE      95

| CONFERENCE IDENTIFICATION INFORMATION | DATA IDENTIFICATION INFORMATION |
|---|---|

PARTICIPANT TABLE      97

| CONFERENCE IDENTIFICATION INFORMATION | USER IDENTIFICATION INFORMATION |
|---|---|

F I G. 1 4
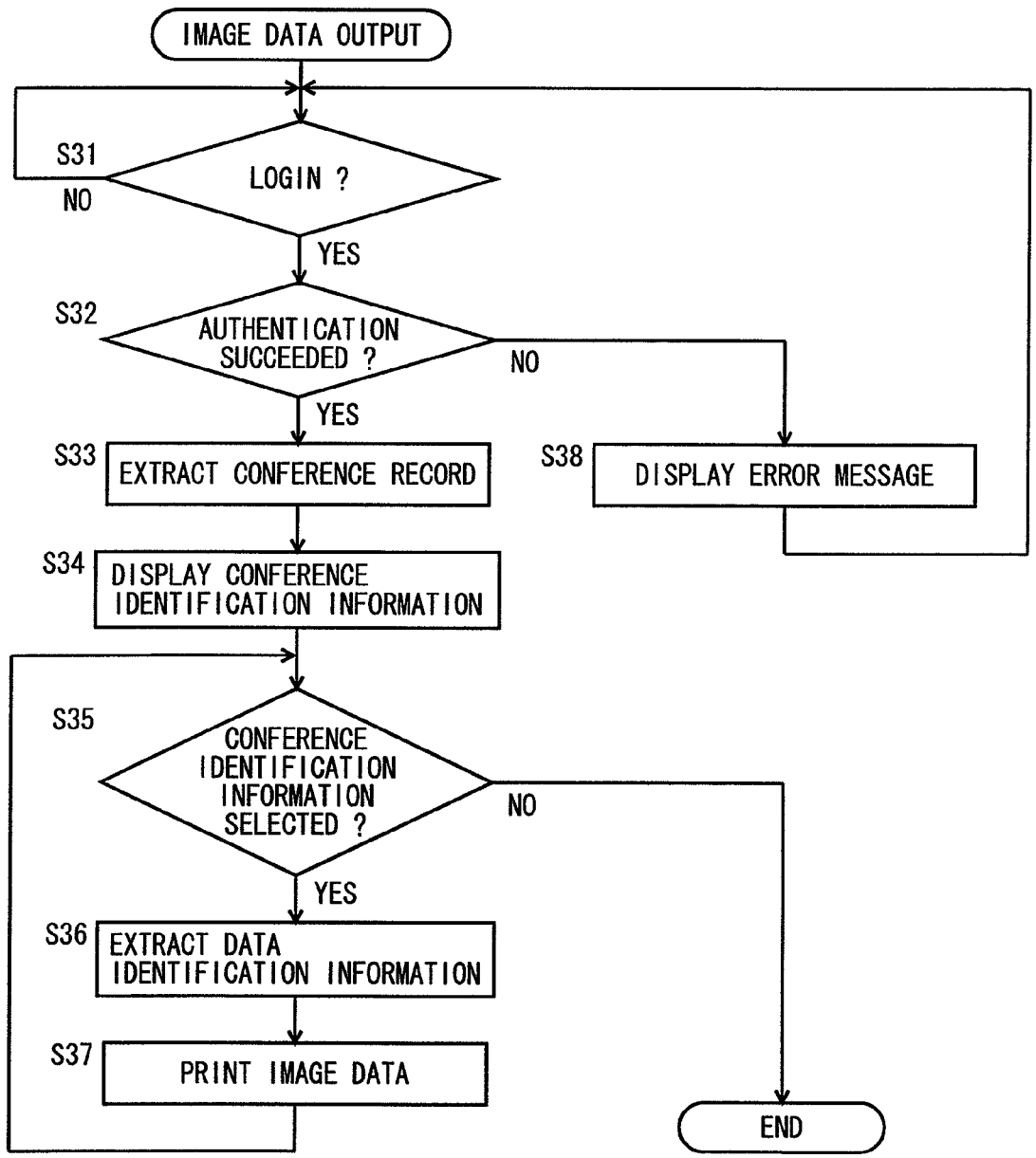

1A

F I G. 1 7
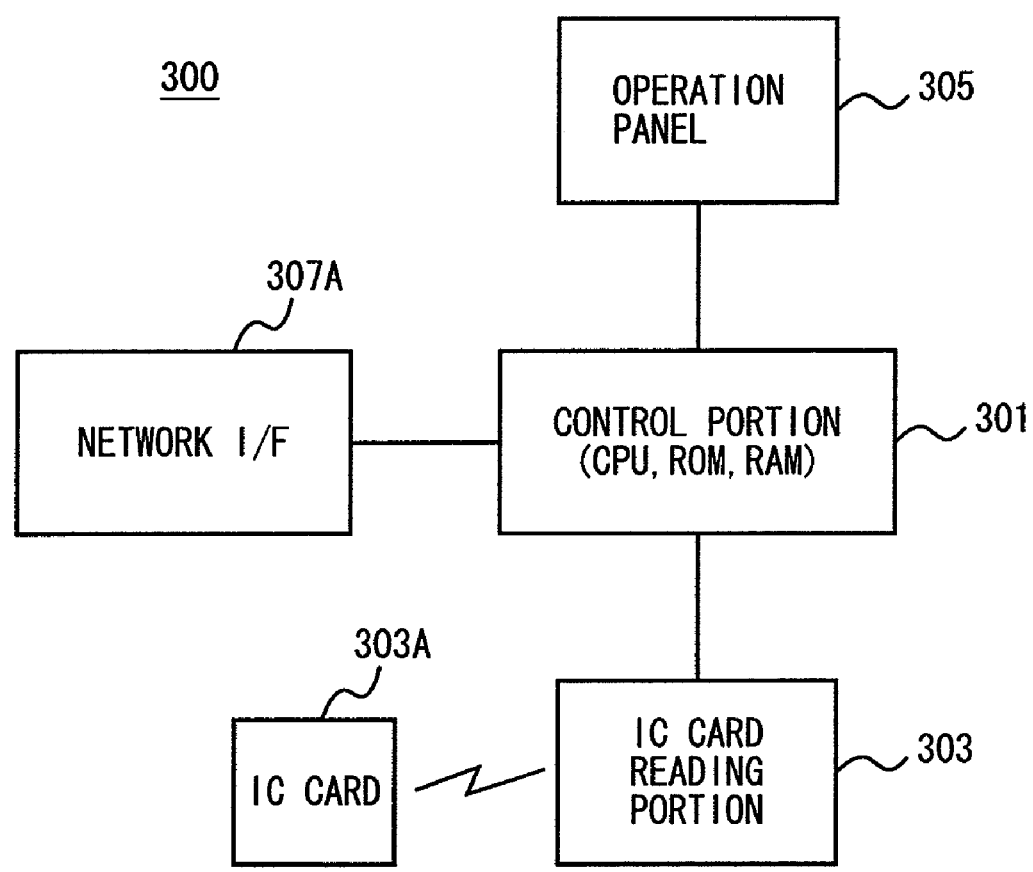

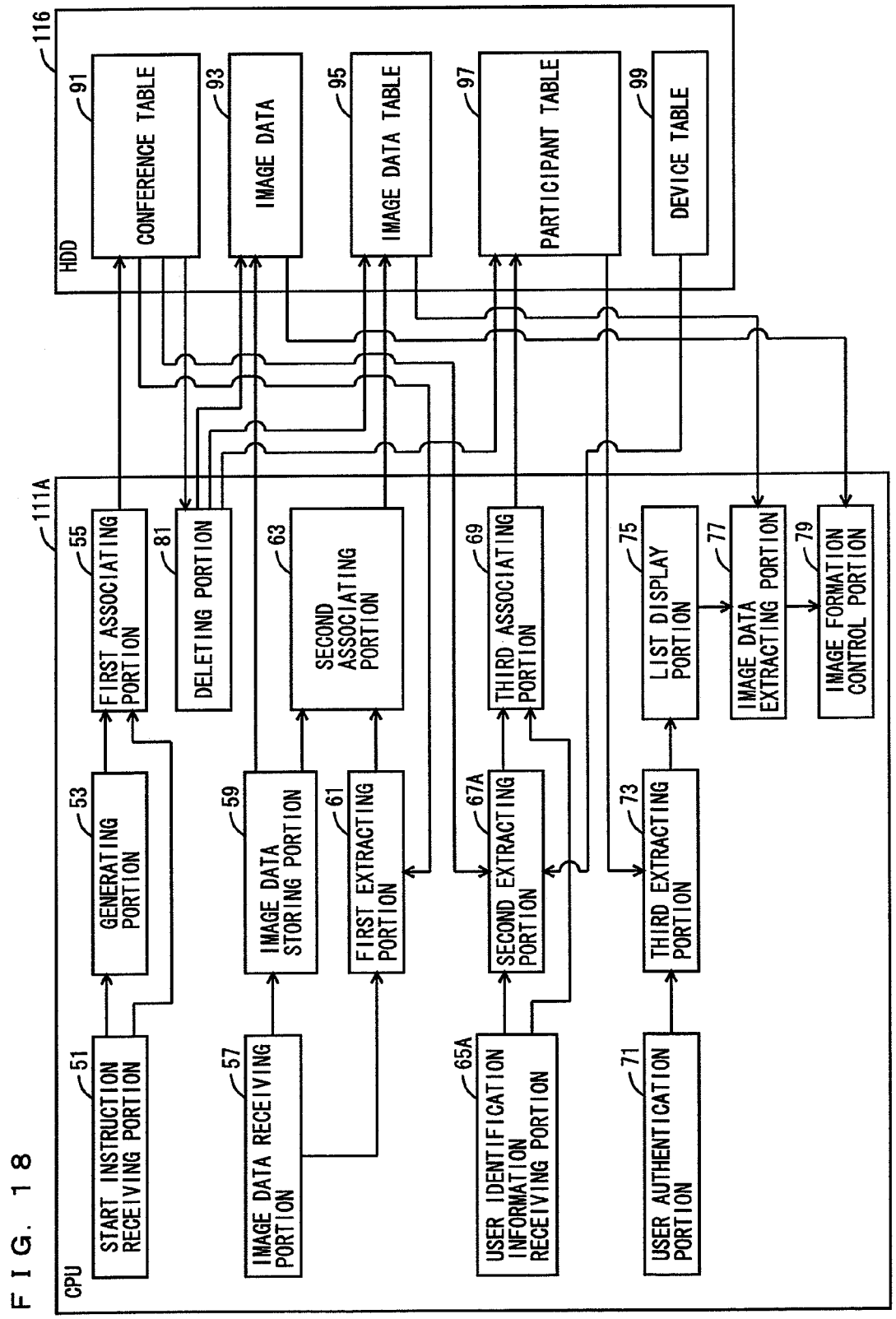

FIG. 19

DEVICE TABLE 99

| ELECTRONIC BOARD'S DEVICE IDENTIFICATION INFORMATION | IC READER'S DEVICE IDENTIFICATION INFORMATION |
|---|---|

CONFERENCE SYSTEM AND IMAGE DATA MANAGEMENT METHOD

This application is based on Japanese Patent Application No. 2009-067061 filed with Japan Patent Office on Mar. 18, 2009, the entire content of which is hereby incorporated by reference.

BACKGROUND OF THE INVENTION

1. Field of the Invention

The present invention relates to a conference system and an image data management method. More particularly, the present invention relates to a conference system including an electronic board and an image processing apparatus, and an image data management method for managing image data which is obtained by converting characters or graphics drawn on the electronic board into an electronic format.

2. Description of the Related Art

In recent years, an electronic board may be used in a conference or for a presentation. With the electronic board, an image of characters or graphics drawn on the board surface is read and converted into an electronic format to be output as image data. The image based on the image data is then printed on a recording medium such as a sheet of paper, which advantageously eliminates the need to transcribe the characters or graphics drawn on the electronic board. In the case where the characters or graphics drawn on the electronic board include confidential information, however, it would be unfavorable if any person can print the image.

Japanese Patent Laid-Open No. 2005-197796 discloses an electronic board which includes a board surface on which an object including characters or graphics may be drawn and which is installed in a specific place such as a conference room. The electronic board determines whether or not the use of its installed place (conference room) has been reserved, and, if the use of the conference room has been reserved, transmits an image file, obtained by detecting an object including characters or graphics drawn on the board surface, to an e-mail address of the user of the conference room.

With the conventional electronic board, it is necessary to register a user of the conference room in advance. This requires an additional reservation or booking system, leading to a complicated configuration of the entire system.

SUMMARY OF THE INVENTION

The present invention has been accomplished in view of the foregoing problems, and an object of the present invention is to provide a conference system which facilitates an output of an image drawn on an electronic board while enhancing security.

Another object of the present invention is to provide an image data management method which facilitates an output of an image drawn on an electronic board while enhancing security.

In order to achieve the above-described objects, according to an aspect of the present invention, a conference system includes an electronic board and an image processing apparatus, wherein the electronic board includes: a reading portion to read characters or graphics drawn on a board surface of the electronic board; a first transmitting portion to transmit image data obtained by reading the board surface to the image processing apparatus; a start operation accepting portion to accept a start operation instructing start of a conference; a second transmitting portion to transmit a start instruction to the image processing apparatus in response to the event that the start operation is accepted; a user identification information acquiring portion to acquire user identification information; and a third transmitting portion to transmit the acquired user identification information to the image processing apparatus, and wherein the image processing apparatus includes: a conference identification information generating portion to generate conference identification information in response to reception of the start instruction from the electronic board; a first associating portion to associate the generated conference identification information with device identification information for identifying the electronic board that transmitted the start instruction; a second associating portion, when image data is received from the electronic board, to associate the received image data with the conference identification information that has been lastly associated with the device identification information for identifying the electronic board that transmitted the image data; a third associating portion, when user identification information is received from the electronic board, to associate the received user identification information with the conference identification information that has been lastly associated with the device identification information for identifying the electronic board that transmitted the user identification information; an authentication portion to authenticate a user; a conference identification information extracting portion to extract conference identification information that is associated with user identification information for the authenticated user; an image data extracting portion to extract image data that is associated with the extracted conference identification information; and an image output portion to output the extracted image data.

According to another aspect of the present invention, a conference system includes an electronic board, a participant identifying apparatus, and an image processing apparatus, wherein the electronic board includes: a reading portion to read characters or graphics drawn on a board surface of the electronic board; a first transmitting portion to transmit image data obtained by reading the board surface to the image processing apparatus; a start operation accepting portion to accept a start operation instructing start of a conference; and a second transmitting portion to transmit a start instruction to the image processing apparatus in response to the event that the start operation is accepted, wherein the participant identifying apparatus includes: a user identification information acquiring portion to acquire user identification information; and a third transmitting portion to transmit the acquired user identification information to the image processing apparatus, and wherein the image processing apparatus includes: a storing portion to store, in advance, device information associating device identification information for the electronic board with device identification information for the participant identifying apparatus; a conference identification information generating portion to generate conference identification information in response to reception of the start instruction from the electronic board; a first associating portion to associate the generated conference identification information with device identification information for identifying the electronic board that transmitted the start instruction; a second associating portion, when image data is received from the electronic board, to associate the received image data with the conference identification information that has been lastly associated with the device identification information for identifying the electronic board that transmitted the image data; a third associating portion, when user identification information is received from the participant identifying apparatus, to associate the received user identification information with the conference identification information that has been lastly associated with the device identification information for the electronic board that is associated by the stored device information with the device identification information for the participant identifying apparatus that transmitted the user identification information; an authentication portion to authenticate a user; a conference identification information extracting portion to extract conference identification information that is associated with user identification information for the authenticated user; an image data extracting portion to extract image data that is associated with the extracted conference identification information; and an image output portion to output the extracted image data.

According to a further aspect of the present invention, an image data management method is performed by an electronic board and an image processing apparatus which is communicable with the electronic board, wherein the method causes the electronic board to perform the steps of reading characters or graphics drawn on a board surface of the electronic board; transmitting image data obtained by reading the board surface to the image processing apparatus; accepting a start operation instructing start of a conference; transmitting a start instruction to the image processing apparatus in response to the event that the start operation is accepted; acquiring user identification information; and transmitting the acquired user identification information to the image processing apparatus, and wherein the method causes the image processing apparatus to perform the steps of: generating conference identification information in response to reception of the start instruction from the electronic board; associating the generated conference identification information with device identification information for identifying the electronic board that transmitted the start instruction; when image data is received from the electronic board, associating the received image data with the conference identification information that has been lastly associated with the device identification information for identifying the electronic board that transmitted the image data; when user identification information is received from the electronic board, associating the received user identification information with the conference identification information that has been lastly associated with the device identification information for identifying the electronic board that transmitted the user identification information; authenticating a user; extracting conference identification information that is associated with user identification information for the authenticated user; extracting image data that is associated with the extracted conference identification information; and outputting the extracted image data.

According to a still further aspect of the present invention, an image data management method is performed by an electronic board, a participant identifying apparatus, and an image processing apparatus, the image processing apparatus including a device storing portion to store, in advance, device information which associates device identification information for the electronic board with device identification information for the participant identifying apparatus, wherein the method causes the electronic board to perform the steps of: reading characters or graphics drawn on a board surface of the electronic board; transmitting image data obtained by reading the board surface to the image processing apparatus; accepting a start operation instructing start of a conference; and transmitting a start instruction to the image processing apparatus in response to the event that the start operation is accepted, wherein the method causes the participant identifying apparatus to perform the steps of: acquiring user identification information; and transmitting the acquired user identification information to the image processing apparatus, and wherein the method causes the image processing apparatus to perform the steps of: generating conference identification information in response to reception of the start instruction from the electronic board; associating the generated conference identification information with device identification information for identifying the electronic board that transmitted the start instruction; when image data is received from the electronic board, associating the received image data with the conference identification information that is associated with the device identification information for identifying the electronic board that transmitted the image data; when user identification information is received from the participant identifying apparatus, associating the received user identification information with the conference identification information that is associated with the device identification information for the electronic board that is associated by the stored device information with the device identification information for the participant identifying apparatus that transmitted the user identification information; authenticating a user; extracting conference identification information that is associated with user identification information for the authenticated user; extracting image data that is associated with the extracted conference identification information; and outputting the extracted image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a conference system according to a first embodiment of the present invention.

FIG. 6 is a functional block diagram showing, by way of example, the functions of a control portion provided in the electronic board.

FIG. 14 is a flowchart illustrating an example of the flow of an image data output process.

FIG. 17 is a functional block diagram schematically showing, by way of example, the functions of the IC reader according to the second embodiment.

FIG. 18 is a functional block diagram showing, by way of example, the functions of the CPU provided in the MFP, together with data stored in the HDD, according to the second embodiment.

FIG. 19 shows an example of the format of a device record included in a device table.

DESCRIPTION OF THE PREFERRED EMBODIMENTS

Figure 2:
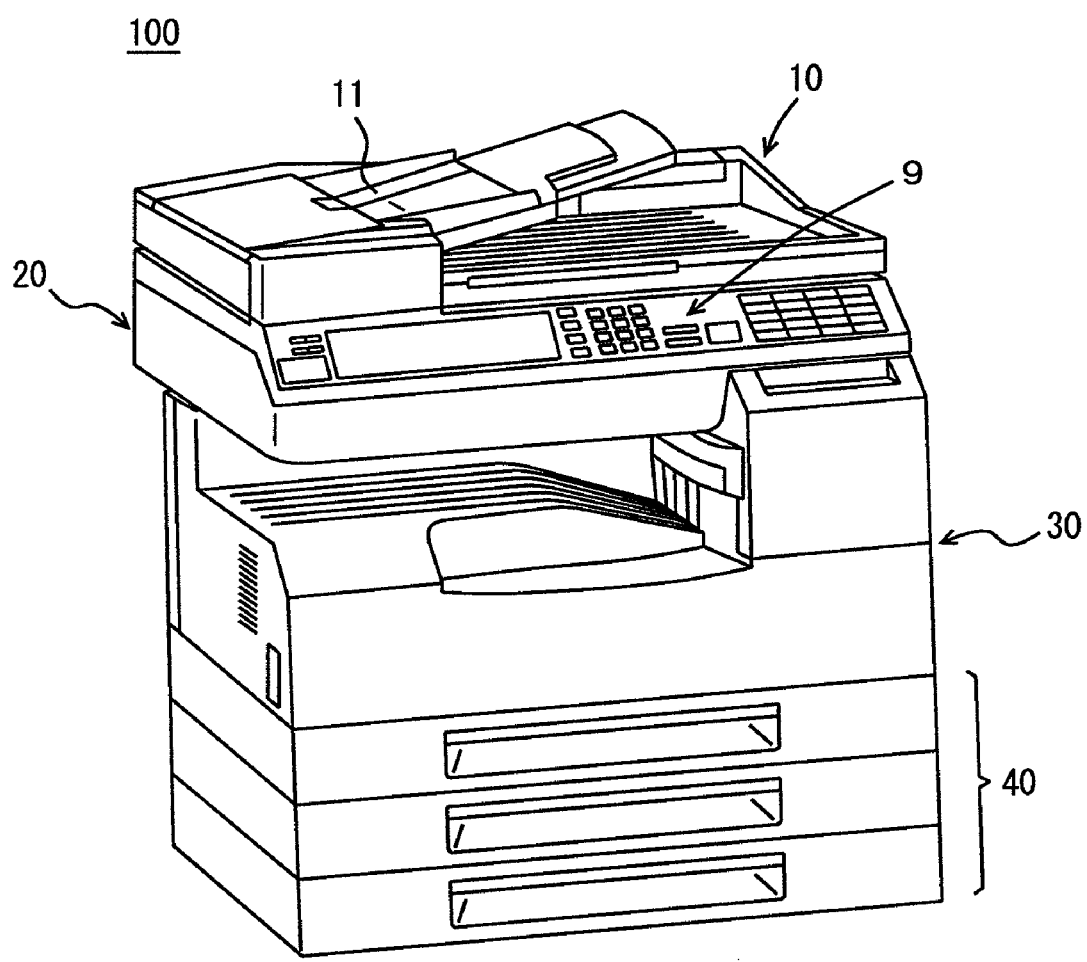
FIG. 2 is a perspective view of an MFP.

Embodiments of the present invention will now be described with reference to the drawings. In the following description, like reference characters denote like parts, which have like names and functions, and therefore, detailed description thereof will not be repeated.

First Embodiment

FIG. 1 schematically shows a conference system according to a first embodiment of the present invention. Referring to FIG. 1, the conference system 1 includes a multi-function peripheral (MFP) 100 as an image processing apparatus, and electronic boards 200, 200A, and 200B. Conference system 1 is arranged in conference rooms A, B, and C, which are spaces physically distant from each other and through which a network 2 is placed. Electronic board 200, which is connected to network 2, is installed in conference room A. Similarly, electronic boards 200A and 200B, which are connected to network 2, are installed in conference rooms B and C, respectively. MFP 100 is connected to network 2, and is capable of communicating with electronic boards 200, 200A, and 200B.

Network 2 is a local area network (LAN), which may be connected in a wired or wireless manner. Further, not limited to the LAN, network 2 may be a wide area network (WAN), public switched telephone networks (PSTN), the Internet, or the like.

Electronic board 200 is connected to an IC reader 300. Similarly, electronic boards 200A and 200B are connected to IC readers 300A and 300B, respectively. IC readers 300, 300A, and 300B, installed respectively in conference rooms A, B, and C, are each arranged at a position easily accessible by a person who goes in and out of the corresponding room, for example at the entrance of the room.

While MFP 100 is described as an example of the image processing apparatus in the present embodiment, not limited to MFP 100, the image processing apparatus may be a printer, a facsimile machine, a computer, or the like, as long as it has the function of printing image data or outputting (e.g., transmitting) the image data. Furthermore, while the arrangement of three physically distant spaces of conference rooms A, B, and C is shown by way of example, the number of spaces is not limited thereto; there may be at least one conference room.

FIG. 2 is a perspective view of the MFP. Referring to FIG. 2, MFP 100 includes: an automatic document feeder (ADF) 10; an image reading portion 20; an image forming portion 30; and a paper feeding portion 40. ADF 10 delivers a plurality of originals mounted on a platform 11 one by one to image reading portion 20. Image reading portion 20 reads image information of photograph, character, picture and the like from the original in an optical manner, to acquire image data.

Image forming portion 30, upon receipt of the image data, forms an image on a sheet of paper on the basis of the image data. Image forming portion 30 forms an image using toners of four colors of cyan, magenta, yellow, and black, to achieve full color printing. Alternatively, it may use one of the toners of four colors for monochrome printing.

Paper feeding portion 40 stores sheets of paper, and supplies them one by one to image forming portion 30. MFP 100 includes an operation panel 9 on its upper surface.

Figure 3:
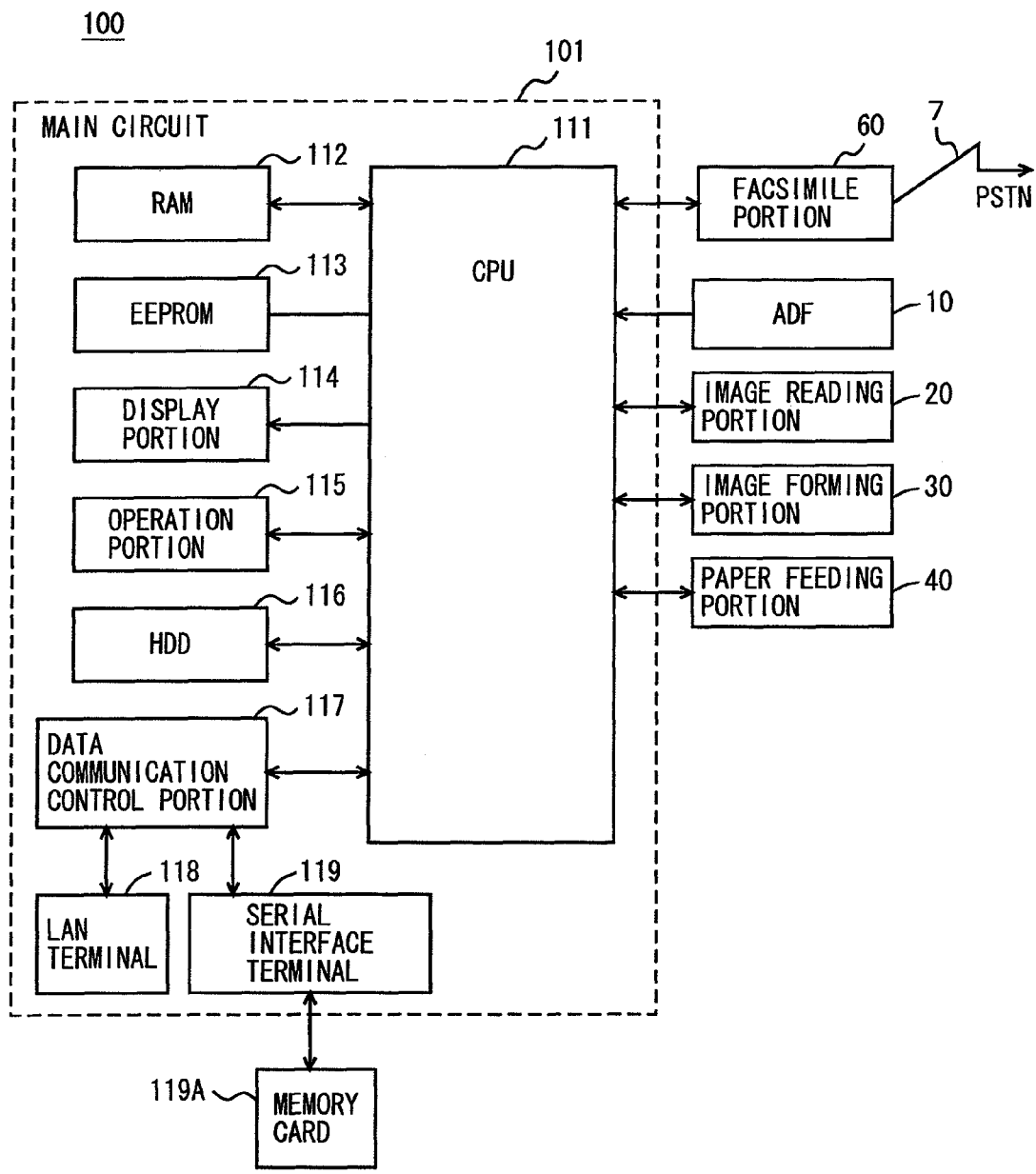
FIG. 3 is a block diagram showing, by way of example, the hardware configuration of the MFP.

FIG. 3 is a block diagram showing, by way of example, the hardware configuration of the MFP. Referring to FIG. 3, MFP 100 includes a main circuit 101, which is connected to a facsimile portion 60, ADF 10, image reading portion 20, image forming portion 30, and paper feeding portion 40. Main circuit 101 includes: a central processing unit (CPU) 111; a random access memory (RAM) 112 used as a work area for CPU 111; an electrically erasable and programmable read only memory (EEPROM) 113 for storing, among others, a program to be executed by CPU 111; a display portion 114; an operation portion 115; a hard disk drive (HDD) 116 as a mass storage; and a data communication control portion 117. CPU 111 is connected to display portion 114, operation portion 115, HDD 116, and data communication control portion 117, and is responsible for overall control of main circuit 101. Further, CPU 111 is connected to facsimile portion 60, ADF 10, image reading portion 20, image forming portion 30, and paper feeding portion 40, and is responsible for overall control of MFP 100.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters, and numerical characters, according to the key operations of the user. Operation portion 115 includes a touch panel provided on display portion 114. Display portion 114 and operation portion 115 constitute operation panel 9.

Data communication control portion 117 includes a LAN terminal 118, which is an interface for communication according to a communication protocol such as transmission control protocol (TCP) or user datagram protocol (UDP), and a serial interface terminal 119 for serial communication. Data communication control portion 117 transmits data to and receives data from an external apparatus connected to LAN terminal 118 or serial interface terminal 119, in accordance with an instruction from CPU 111.

When a LAN cable for connection with network 2 is connected to LAN terminal 118, data communication control portion 117 can communicate with electronic boards 200, 200A, and 200B via LAN terminal 118.

CPU 111 controls data communication control portion 117 to read from a memory card 119A a program to be executed by CPU 111, and stores the read program in RAM 112 for execution. It is noted that the recording medium for storing the program to be executed by CPU 111 is not restricted to memory card 119A. It may be a flexible disk, a cassette tape, an optical disc (compact disc-ROM (CD-ROM), magneto-optical (MO) disc, mini disc (MD), digital versatile disc (DVD)), an IC card, an optical card, or a semiconductor memory such as a mask ROM, an EPROM, an EEPROM, or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the one that can be directly executed by CPU 111, but also a source program, a compressed program, an encrypted program, and others.

Facsimile portion 60 is connected to PSTN 7, and transmits facsimile data to or receives facsimile data from PSTN 7. Facsimile portion 60 stores the received facsimile data in HDD 116, or image forming portion 30 prints the facsimile data on a sheet of paper. Further, facsimile portion 60 converts the data stored in HDD 116 to facsimile data, and outputs it to another MFP or a facsimile machine connected to PSTN 7. This allows the data stored in HDD 116 to be output to a facsimile machine or another MFP.

Figure 4:
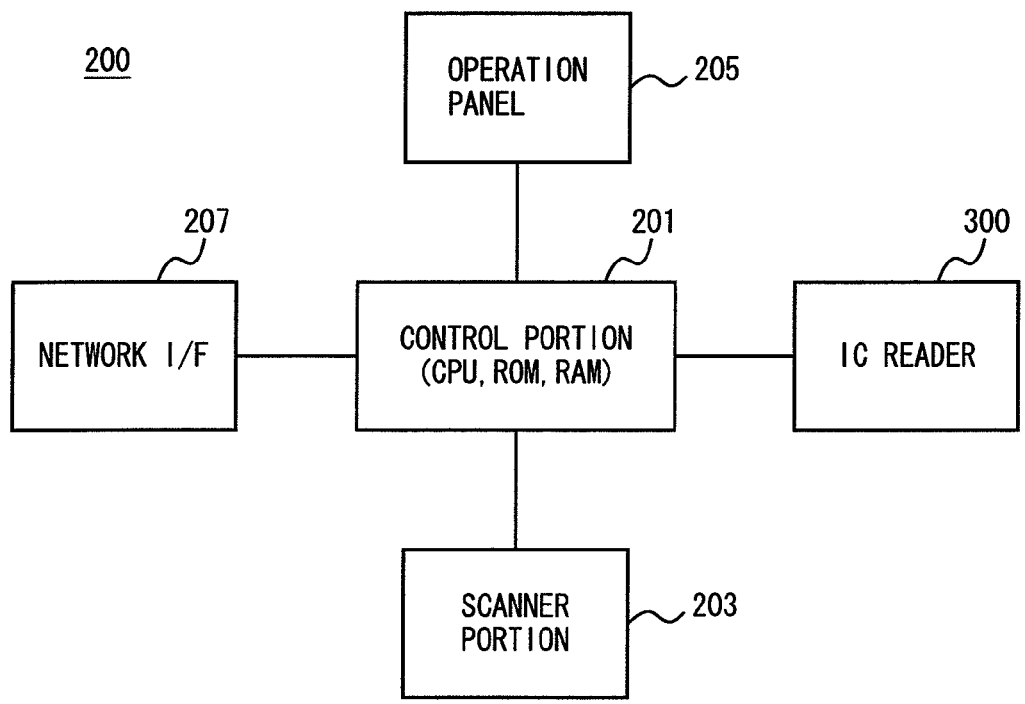
FIG. 4 is a functional block diagram schematically showing, by way of example, the functions of an electronic board.

FIG. 4 is a functional block diagram schematically showing, by way of example, the functions of electronic board 200. Referring to FIG. 4, electronic board 200 includes: a control portion 201 responsible for overall control of electronic board 200; a network I/F 207 for connecting electronic board 200 to network 2; an operation panel 205; a scanner portion 203; and IC reader 300.

Control portion 201 includes a CPU, a RAM used as a work area, and a ROM for storing a program to be executed by the CPU. Operation panel 205 is a user interface, and includes a display portion such as a liquid crystal display and an operation portion including a plurality of keys.

Electronic board 200 has a board surface on which characters and/or graphics may be written with a board marker or the like. Scanner portion 203 includes a light source and a photoelectric conversion element such as a charge coupled device (CCD) sensor. Scanner portion 203 reads an image including characters and/or graphics drawn on the board surface, and converts it into electric signals constituting image data. Scanner portion 203 outputs the image data to control portion 201. Scanner portion 203 may be replaced with a digital camera. In this case, the digital camera picks up an image on the board surface, and transmits the resultant image data to control portion 201.

Figure 5:
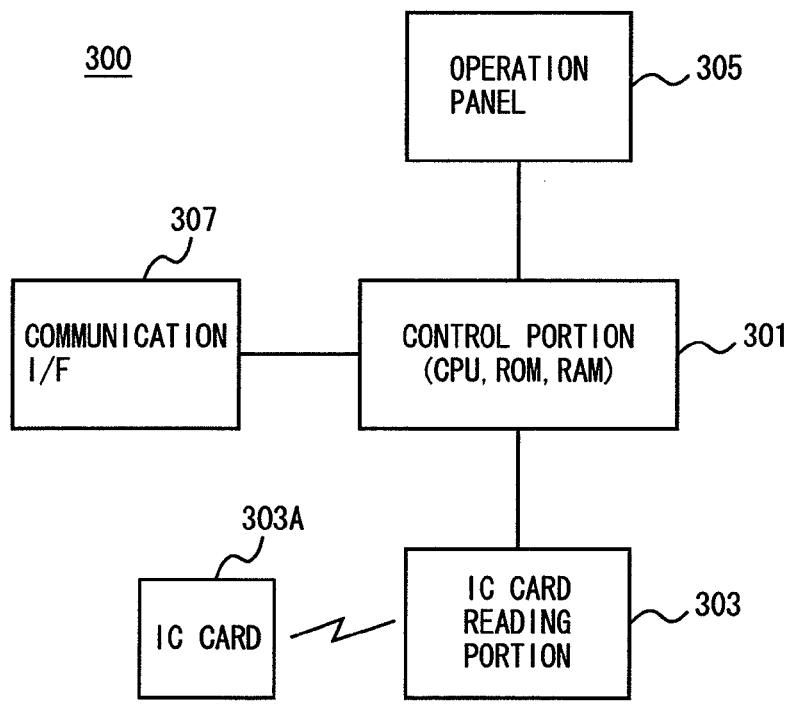
FIG. 5 is a functional block diagram schematically showing, by way of example, the functions of an IC reader.

FIG. 5 is a functional block diagram schematically showing, by way of example, the functions of IC reader 300. Referring to FIG. 5, IC reader 300 includes a control portion 301 responsible for overall control of IC reader 300, a communication I/F 307 for connecting IC reader 300 to electronic board 200, an operation panel 305, and an IC card reading portion 303.

Control portion 301 includes a CPU, a RAM used as a work area, and a ROM for storing a program to be executed by the CPU. Operation panel 305 is a user interface, and includes a display portion such as a liquid crystal display, and an operation portion including a plurality of keys.

IC card reading portion 303 communicates, via radio, with an IC card 303A possessed by a participant. IC card 303A is provided with a radio communication portion and a semiconductor memory, and stores in the memory a user ID as user identification information for identifying the person who possesses IC card 303A. When IC card 303A enters an area within which it is communicable with IC card reading portion 303, IC card 303A communicates with IC card reading portion 303. IC card 303A transmits the user ID, stored in the semiconductor memory, to IC card reading portion 303. Upon receipt of the user ID from IC card 303A, IC card reading portion 303 outputs the user ID to control portion 301. Control portion 301 temporarily stores the user ID in the RAM, and outputs the same to electronic board 200 via communication I/F 307.

IC reader 300 is configured to control accesses to conference room A, and preferably stores, in the RAM, user IDs of the users currently present in the room. In this case, operation panel 305 of IC reader 300 may include an "in" key and an "out" key, for example, to enable switching between an "in" mode and an "out" mode. In the case where a user ID is received during the "in" mode, IC reader 300 stores the user ID in the RAM, while when a user ID is received during the "out" mode, IC reader 300 erases, from the user IDs stored in the RAM, the same user ID as the received one.

IC card 303A may store, instead of the user ID, an identification number assigned to IC card 303A. In this case, in MFP 100, the user ID and the identification number assigned to IC card 303A may be associated with each other. While IC card 303A and IC card reading portion 303 communicate with each other via radio in the present embodiment, IC card 303A may be provided with a recording medium such as a magnetic tape, in which case IC card reading portion 303 may read information stored in the recording medium.

FIG. 6 is a functional block diagram showing, by way of example, the functions of the control portion provided in the electronic board. Referring to FIG. 6, control portion 201 provided in electronic board 200 includes: an image data acquiring portion 211 to acquire image data; a first transmitting portion 213 to transmit image data to MFP 100; a start instruction accepting portion 215 to accept a start instruction; a second transmitting portion 217 to transmit a start instruction to MFP 100; a user identification information acquiring portion 219 to acquire user identification information; and a third transmitting portion 221 to transmit user identification information to MFP 100. These portions are functionally implemented when the CPU included in control portion 201 executes a program stored in the ROM.

When a user presses a read instruction button provided in operation panel 205, image data acquiring portion 211 accepts a read instruction from operation panel 205. When accepting the read instruction, image data acquiring portion 211 controls scanner portion 203 to read an image of characters or graphics drawn on the board surface, and acquires the image data output from scanner portion 203. Image data acquiring portion 211 then outputs the acquired image data to first transmitting portion 213. Upon receipt of the image data from image data acquiring portion 211, first transmitting portion 213 transmits the image data to MFP 100 via network I/F 207.

When the user presses a start instruction button provided in operation panel 205, start instruction accepting portion 215 accepts a start instruction from operation panel 205. When accepting the start instruction, start instruction accepting portion 215 outputs the start instruction to second transmitting portion 217. Upon receipt of the start instruction from start instruction accepting portion 215, second transmitting portion 217 transmits the start instruction to MFP 100 via network I/F 207.

When user identification information is input from IC reader 300, user identification information acquiring portion 219 outputs the user identification information to third transmitting portion 221. Third transmitting portion 221 transmits the user identification information to MFP 100 via network I/F 207.

Figure 7:
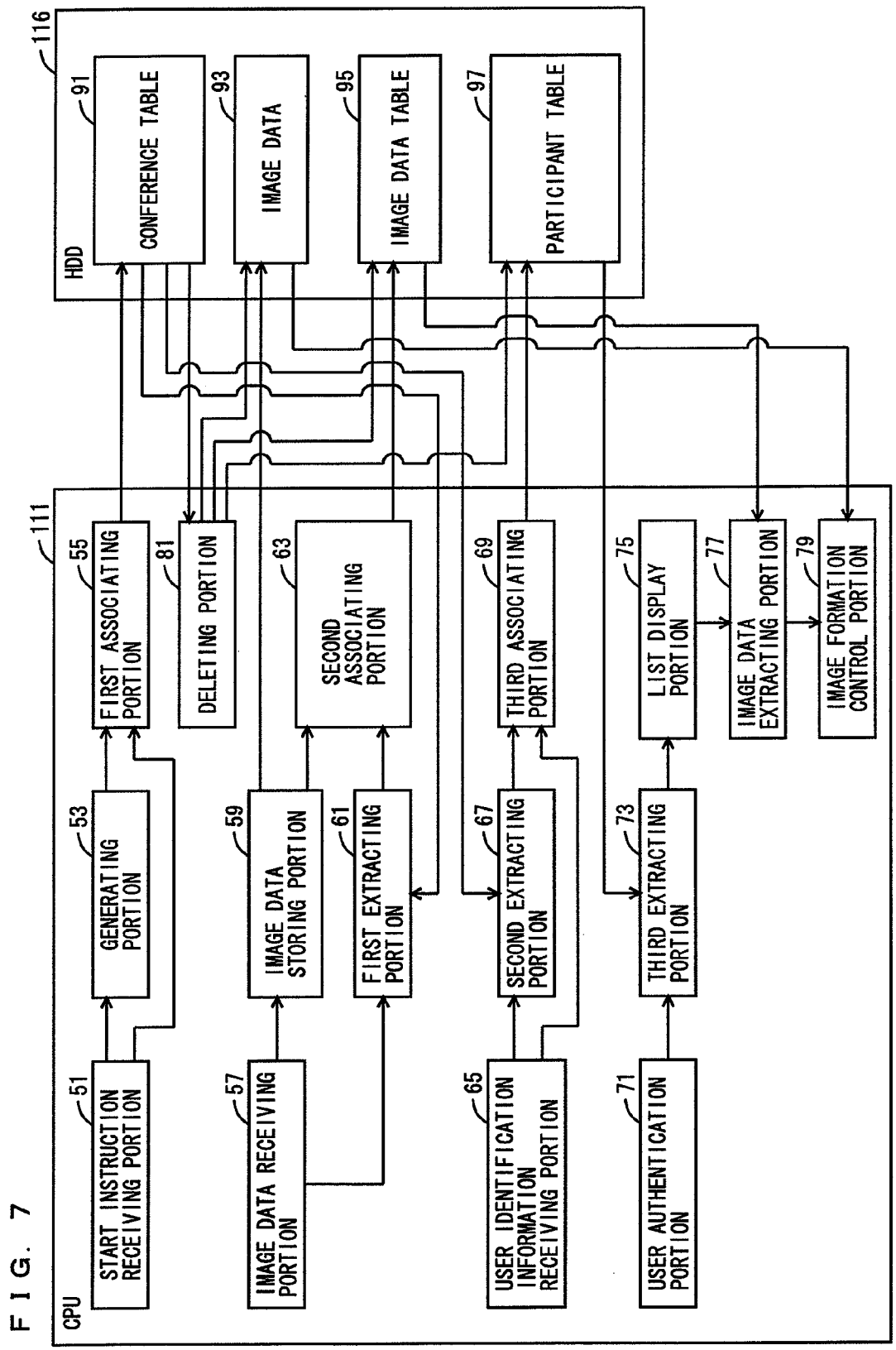
FIG. 7 is a functional block diagram showing, by way of example, the functions of a CPU provided in the MFP, together with data stored in an HDD.

FIG. 7 is a functional block diagram showing, by way of example, the functions of the CPU provided in the MFP, together with data stored in the HDD. The functions shown in FIG. 7 are implemented when CPU 111 provided in MFP 100 of the present embodiment executes a program stored in memory card 119A or EEPROM 113. Referring to FIG. 7, CPU 111 provided in MFP 100 includes, as the functions implemented when the above-described program is executed: a start instruction receiving portion 51 to receive a start instruction; a generating portion 53 to generate conference identification information; a first associating portion 55 to associate conference identification information with an electronic board that issued a start instruction; an image data receiving portion 57 to receive image data; an image data storing portion 59 to store image data in HDD 116; a first extracting portion 61 to extract conference identification information which is associated with an electronic board that transmitted image data; a second associating portion 63 to associate image data with conference identification information; a user identification information receiving portion 65 to receive user identification information; a second extracting portion 67 to extract conference identification information which is associated with an electronic board that transmitted user identification information; a third associating portion 69 to associate user identification information with conference identification information; a user authentication portion 71 for authenticating a user who operates MFP 100; a third extracting portion 73 to extract conference identification information which is associated with user identification information; a list display portion 75 for displaying a list of extracted conference identification information; an image data extracting portion 77 to extract image data which is associated with selected conference identification information; an image formation control portion 79 which controls image forming portion 30 to print extracted image data; and a deleting portion 81.

Start instruction receiving portion 51 controls data communication control portion 117 to receive a start instruction from one of electronic boards 200, 200A, and 200B. Upon receipt of a start instruction from one of electronic boards 200, 200A, and 200B, start instruction receiving portion 51 outputs device identification information for identifying the one of electronic boards 200, 200A, and 200B that issued the start instruction to first associating portion 55, and outputs a generation instruction to generating portion 53. The device identification information for identifying the electronic board may be, e.g., a name assigned to the electronic board, or an address assigned to the electronic board in network 2. Here, as the device identification information for identifying the electronic board, an Internet protocol (IP) address assigned to the electronic board in network 2 is used. A media access control (MAC) address may be used as well.

Upon receipt of a generation instruction from start instruction receiving portion 51, generating portion 53 generates conference identification information, and outputs the generated conference identification information to first associating portion 55. The conference identification information is unique information assigned by MFP 100, which may be, e.g., a combination of date, time, and serial number.

First associating portion 55 associates the device identification information received from start instruction receiving portion 51 with the conference identification information received from generating portion 53. Specifically, first associating portion 55 generates a conference record including device identification information, conference identification information, and a conference flag, and stores the generated conference record additionally in a conference table 91 stored in HDD 116.

Figures 8, 9, 10, 11:
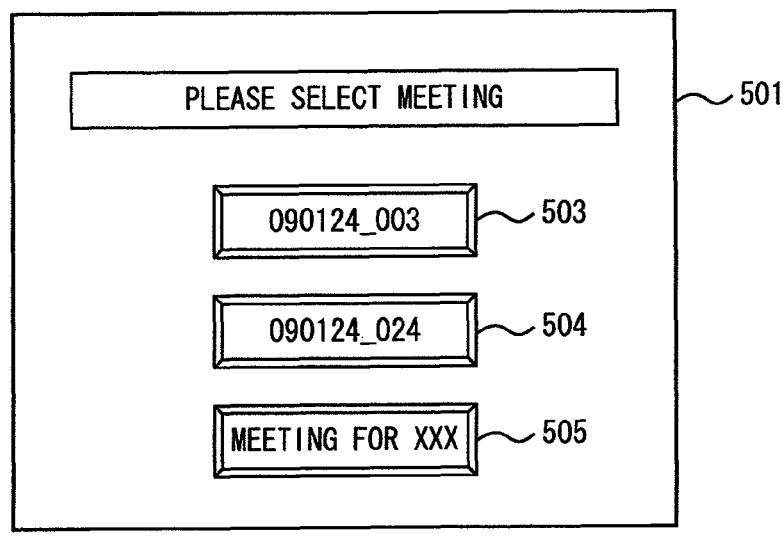
FIG. 8 shows an example of the format of a conference record.
FIG. 9 shows an example of the format of an image data record.
FIG. 10 shows an example of the format of a participant record.
FIG. 11 shows an example of a list display screen.

FIG. 8 shows an example of the format of the conference record. Referring to FIG. 8, the conference record includes the fields of "conference identification information", "device identification information", and "conference flag". In the "conference identification information" field, the conference identification information assigned by MFP 100 is set. In the "device identification information" field, the device identification information for the electronic board that issued the start instruction is set. In the "conference flag" field, "ON" is set while the conference is being held, and "OFF" is set when the conference is over.

Returning to FIG. 7, first associating portion 55 generates a conference record by setting the device identification information input from start instruction receiving portion 51 in the "device identification information" field, the conference identification information input from generating portion 53 in the "conference identification information" field, and "ON" in the "conference flag" field in the conference record. First associating portion 55 then stores the generated conference record additionally in conference table 91.

Image data receiving portion 57 controls data communication control portion 117 to receive image data from one of electronic boards 200, 200A, and 200B. Upon receipt of image data from one of electronic boards 200, 200A, and 200B, image data receiving portion 57 outputs the image data to image data storing portion 59, and outputs the device identification information for identifying the one of electronic boards 200, 200A, and 200B that transmitted the image data, to first extracting portion 61.

Upon receipt of the image data from image data receiving portion 57, image data storing portion 59 stores the image data in HDD 116, and also outputs to second associating portion 63 data identification information for identifying the image data stored in HDD 116. As a result, image data 93 is stored in HDD 116. As the data identification information, any information may be used as long as it can identify the image data, which may be a file name, for example. Upon receipt of the device identification information from image data receiving portion 57, first extracting portion 61 searches conference table 91 stored in HDD 116 using the device identification information, to extract a conference record that includes the relevant device identification information and has "ON" set in the "conference flag" field. First extracting portion 61 then outputs to second associating portion 63 the conference identification information included in the extracted conference record. While a plurality of conference records having identical device identification information set in the "device identification information" field may be stored in conference table 91, the conference record having "ON" set in the "conference flag" field is the one of those conference records that has been stored lastly in conference table 91. In other words, the conference record having "ON" set in the "conference flag" field includes the conference identification information lastly associated with the relevant device identification information by first associating portion 55.

Second associating portion 63 associates the conference identification information input from first extracting portion 61 with the data identification information input from image data storing portion 59. Specifically, second associating portion 63 generates an image data record including data identification information and conference identification information, and stores the generated image data record additionally in an image data table 95 stored in HDD 116.

FIG. 9 shows an example of the format of the image data record. Referring to FIG. 9, the image data record includes the fields of "conference identification information" and "data identification information". In the "conference identification information" field, the conference identification information is set, and in the "data identification information" field, the data identification information for identifying the image data is set.

Returning to FIG. 7, second associating portion 63 generates an image data record by setting the conference identification information input from first extracting portion 61 in the "conference identification information" field, and the data identification information input from image data storing portion 59 in the "data identification information" field in the image data record, and stores the generated image data record additionally in image data table 95.

User identification information receiving portion 65 controls data communication control portion 117 to receive user identification information from one of electronic boards 200, 200A, and 200B. Upon receipt of the user identification information from one of electronic boards 200, 200A, and 200B, user identification information receiving portion 65 outputs the user identification information to third associating portion 69, and outputs the device identification information for identifying the one of electronic boards 200, 200A, and 200B that transmitted the user identification information, to second extracting portion 67.

Upon receipt of the device identification information from user identification information receiving portion 65, second extracting portion 67 searches conference table 91 stored in HDD 116 using the received device identification information, to extract a conference record that includes the device identification information and has "ON" set in the "conference flag" field. Second extracting portion 67 outputs the conference identification information included in the extracted conference record to third associating portion 69. Among a plurality of conference records stored in conference table 91 and having identical device identification information set in the "device identification information" field, the conference record having "ON" set in the "conference flag" field is the one of those conference records that has been stored lastly in conference table 91. In other words, the conference record having "ON" set in the "conference flag" field includes the conference identification information lastly associated with the relevant device identification information by first associating portion 55.

Third associating portion 69 associates the conference identification information input from second extracting portion 67 with the user identification information input from user identification information receiving portion 65. Specifically, third associating portion 69 generates a participant record including conference identification information and user identification information, and stores the generated participant record additionally in a participant table 97 stored in HDD 116.

FIG. 10 shows an example of the format of the participant record. Referring to FIG. 10, the participant record includes the fields of "conference identification information" and "user identification information". In the "conference identification information" field, the conference identification information is set, and in the "user identification information" field, the user identification information for identifying the user who is participating in the conference is set.

Returning to FIG. 7, third associating portion 69 generates a participant record by setting the conference identification information input from second extracting portion 67 in the "conference identification information" field, and the user identification information input from user identification information receiving portion 65 in the "user identification information" field in the participant record, and stores the generated participant record additionally in participant table 97.

User authentication portion 71 authenticates a user who operates MFP 100. When a user inputs user identification information and a password into operation portion 115, user authentication portion 71 accepts the user identification information and the password from operation portion 115. If a pair of user identification information and a password identical to the accepted pair is stored in advance in HDD 116, user authentication portion 71 authenticates the user. When user authentication portion 71 authenticates the user, it outputs the user identification information for the user to third extracting portion 73.

Upon receipt of the user identification information from user authentication portion 71, third extracting portion 73 searches participant table 97 stored in HDD 116 using the received user identification information, to extract a participant record including the user identification information. Third extracting portion 73 then outputs the conference identification information included in the extracted participant record, to list display portion 75.

List display portion 75 displays on display portion 114 a list display screen including the conference identification information input from third extracting portion 73. The list display screen displays the conference identification information in a selectable manner. In the case where a plurality of pieces of conference identification information are input, the list display screen displays all the input pieces of conference identification information. When an instruction to select any of the conference identification information included in the list display screen displayed on display portion 114 is input into operation portion 115, list display portion 75 outputs the conference identification information specified by the operation input into operation portion 115, to image data extracting portion 77.

FIG. 11 shows an example of the list display screen. Referring to FIG. 11, the list display screen 501 includes three buttons 503 to 505 corresponding respectively to conference identification information. When the user inputs into operation portion 115 an operation to designate any of buttons 503 to 505, an operation to select the corresponding conference identification information is input into MFP 100.

Returning to FIG. 7, upon receipt of the conference identification information from list display portion 75, image data extracting portion 77 searches image data table 95 stored in HDD 116 using the received conference identification information, to extract an image data record including the conference identification information. Image data extracting portion 77 then outputs the data identification information included in the extracted image data record, to image formation control portion 79. Image formation control portion 79 reads, from image data 93 stored in HDD 116, the image data specified by the data identification information input from image data extracting portion 77, and outputs the read image data 93 to image forming portion 30 for printing thereof. That is, when a user participating in a conference is authenticated by user authentication portion 71, image formation control portion 79 prints the image data associated with the user. This prevents the content of the image data from being revealed to others who are not participating in the conference, resulting in enhanced security.

In the above embodiment, for outputting image data, image formation control portion 79 causes image forming portion 30 to print image data specified by the data identification information input from image data extracting portion 77. Alternatively, the image data may be output in association with the user who has been authenticated by user authentication portion 71. For example, in the case where HDD 116 includes storage areas assigned to respective users, the image data may be stored in the storage area assigned to the user authenticated by user authentication portion 71. In user data stored in advance in HDD 116, an e-mail address assigned to a user may be associated with the user identification information for the user, and the image data may be transmitted via e-mail. Specifically, e-mail including the image data specified by the data identification information input from image data extracting portion 77 and addressed to the e-mail address assigned to the user authenticated by user authentication portion 71 may be generated, and the generated e-mail may be transmitted via data communication control portion 117 to an e-mail server connected to network 2. The image data may be transmitted, not only via e-mail, but also using a communication protocol such as file transfer protocol (FTP) or server message block (SMB), as long as it ensures that the data is transmitted only to the authenticated user.

After a lapse of a predetermined period of time from when the conference is over, deleting portion 81 deletes any participant record including the user identification information of the user who participated in the conference, and the image data of any image read from the electronic board during the conference. Specifically, for each of the conference records included in conference table 91, the time from when the conference flag has been set to "OFF" is counted, to determine any conference record for which the predetermined period of time has passed from when the conference flag was set to "OFF". Then, the conference identification information set in the "conference identification information" field in the determined conference record is extracted. Deleting portion 81 then searches participant table 97 to extract any participant record including the extracted conference identification information, and deletes all the extracted participant records from participant table 97. Further, deleting portion 81 searches image data table 95 to extract any image data record including the extracted conference identification information, and deletes all the extracted image data records from image data table 95. It also erases, from HDD 116, image data 93 specified by the data identification information set in the "data identification information" field in the deleted image data records. This prevents image data 93 including confidential matters from being kept forever in HDD 116.

Figure 12:
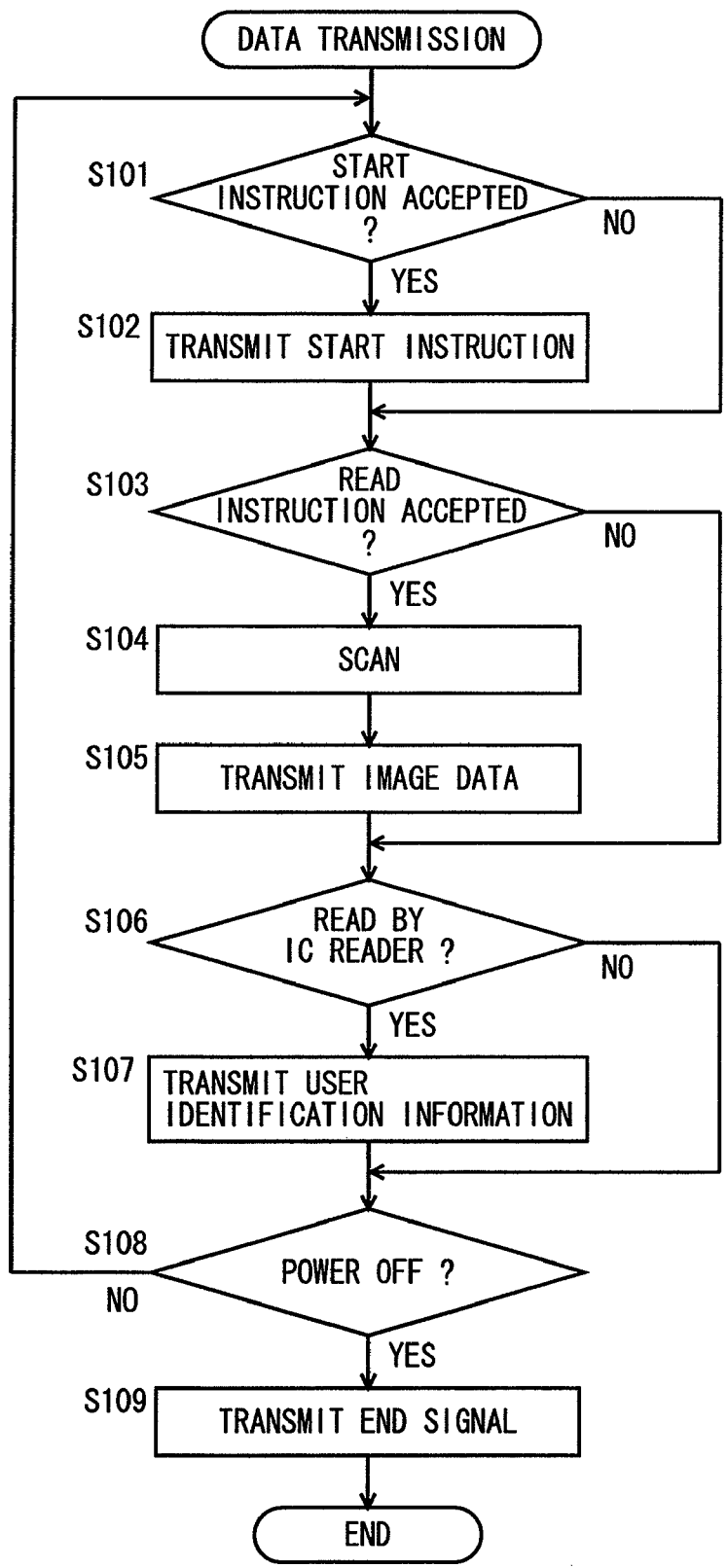
FIG. 12 is a flowchart illustrating an example of the flow of a data transmission process.

FIG. 12 is a flowchart illustrating an example of the flow of a data transmission process. The data transmission process is carried out by control portion 201 provided in electronic board 200 as control portion 201 performs an image data management program. The image data management program is stored in advance in the ROM provided in control portion 201. Alternatively, a detachable memory may be attached to electronic board 200, and the image data management program stored in that memory may be loaded to the RAM for execution.

Referring to FIG. 12, control portion 201 determines whether a start instruction has been accepted (step S101). When a user presses a start instruction button provided in operation panel 205, the start instruction is accepted. If the start instruction is accepted, the process proceeds to step S102; otherwise, the process proceeds to step S103, with step S102 being skipped. In step S102, the start instruction is transmitted to MFP 100, and the process proceeds to step S103.

In step S103, it is determined whether a read instruction has been accepted. When the user presses a read instruction button provided in operation panel 205, the read instruction is accepted. If the read instruction is accepted, the process proceeds to step S104; otherwise, the process proceeds to step S106. In step S104, control portion 201 starts scanner portion 203 to cause it to read the image of characters or graphics drawn on the board surface, and accepts the image data. In step S105, it transmits the image data output from scanner portion 203 to MFP 100, and the process proceeds to step S106.

In step S106, it is determined whether IC reader 300 has read an IC card 303A. When user identification information is input from IC reader 300, it is determined that IC reader 300 has read IC card 303A. If IC reader 300 has read IC card 303A, the process proceeds to step S107; otherwise, the process proceeds to step S108, with step S107 being skipped. In step S107, the user identification information output from IC reader 300 is transmitted to MFP 100, and the process proceeds to step S108.

In step S108, it is determined whether power has been turned OFF. If the power has been turned OFF, the process proceeds to step S109; otherwise, the process returns to step S101. In step S109, an end signal is transmitted to MFP 100, and the process is terminated.

Figure 13:
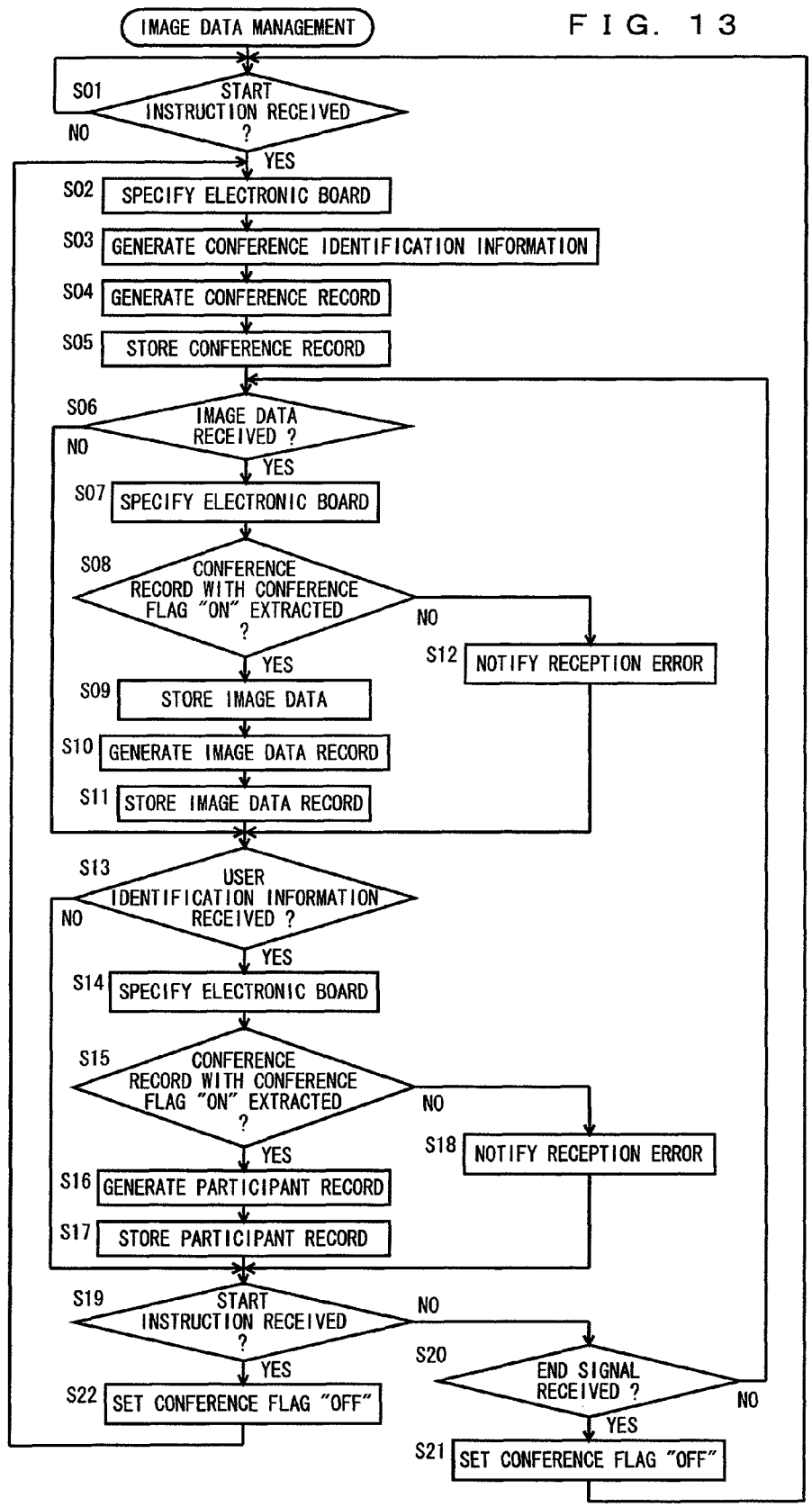
FIG. 13 is a flowchart illustrating an example of the flow of an image data management process.

FIG. 13 is a flowchart illustrating an example of the flow of an image data management process. The image data management process is carried out by CPU 111 provided in MFP 100 as CPU 111 performs the image data management program. Referring to FIG. 13, CPU 111 determines whether a start instruction has been received. CPU 111 is in a standby mode until it receives a start instruction (NO in step S01), and once the start instruction is received (YES in step S01), the process proceeds to step S02. When data communication control portion 117 receives a start instruction from one of electronic boards 200, 200A, and 200B, it is determined that the start instruction has been received. That is, the image data management process is carried out on the condition that the start instruction is received from one of electronic boards 200, 200A, and 200B. One process is generated for carrying out the image data management process for each of electronic boards 200, 200A, and 200B. For example, when a start instruction is received from electronic board 200, one process is generated for executing the image data management process for electronic board 200. When another start instruction is received from electronic board 200A while the process for electronic board 200 is being executed, another process is generated for executing the image data management process for electronic board 200A.

In step S02, the electronic board that issued the received start instruction is specified. Specifically, when receiving the start instruction, data communication control portion 117 also receives an IP address of the electronic board that issued the start instruction, and thus, the received IP address is used to specify the electronic board that issued the start instruction. Here, the IP address of the electronic board is used as the device identification information for identifying the electronic board.

In step S03, conference identification information is generated. The conference identification information may be any information as long as it uniquely identifies the conference. Here, a combination of date, time, and serial number is used as the conference identification information. A conference record is generated (step S04), and the generated conference record is stored additionally in conference table 91 stored in HDD 116 (step S05). Specifically, a conference record is generated by setting the device identification information of the electronic board specified in step S02 in the "device identification information" field, the conference identification information generated in step S03 in the "conference identification information" field, and "ON" in the "conference flag" field in the conference record.

In step S06, it is determined whether image data has been received. If the image data is received, the process proceeds to step S07; otherwise, the process proceeds to step S13. When data communication control portion 117 receives image data from any of electronic boards 200, 200A, and 200B, it is determined that the image data has been received.

In step S07, the electronic board that transmitted the received image data is specified. Specifically, when receiving the image data, data communication control portion 117 also receives an IP address of the electronic board that transmitted the image data. Thus, the received IP address is used to specify the electronic board that transmitted the image data.

In the following step S08, it is determined whether a conference record having the conference flag set to "ON" has been extracted. Specifically, conference table 91 stored in HDD 116 is searched using the device identification information of the electronic board specified in step S07, and it is determined whether a conference record including the relevant device identification information and having "ON" set in the "conference flag" field has been extracted. If such a conference record has been extracted, the process proceeds to step S09; otherwise, the process proceeds to step S12. In step S12, a reception error is notified, and the process proceeds to step S13. Specifically, a signal indicating a reception error is transmitted to the electronic board that transmitted the image data received in step S06.

In step S09, the image data received in step S06 is stored in HDD 116. As a result, image data 93 is stored in HDD 116. An image data record is generated (step S10), and the generated image data record is stored additionally in image data table 95 stored in HDD 116 (step S11). Specifically, an image data record is generated by setting in its "conference identification information" field the conference identification information identical to the one that is set in the "conference identification information" field of the conference record extracted in step S08, and by setting in its "data identification information" field the data identification information for the image data that has been stored in HDD 116 in step S09.

In step S13, it is determined whether user identification information has been received. If the user identification information has been received, the process proceeds to step S14; otherwise, the process proceeds to step S19. When data communication control portion 117 receives user identification information from one of electronic boards 200, 200A, and 200B, it is determined that the user identification information has been received.

In step S14, the electronic board that transmitted the received user identification information is specified. Specifically, when receiving the user identification information, data communication control portion 117 also receives the IP address of the electronic board that transmitted the user identification information. The received IP address is used to specify the electronic board that transmitted the user identification information.

In the following step S15, it is determined whether a conference record having the conference flag set to "ON" has been extracted. Specifically, conference table 91 stored in HDD 116 is searched using the device identification information of the electronic board specified in step S14, and it is determined whether a conference record including the relevant device identification information and having "ON" set in the "conference flag" field has been extracted. If such a conference record is extracted, the process proceeds to step S16; otherwise, the process proceeds to step S18. In step S18, a reception error is notified, and the process proceeds to step S19. Specifically, a signal indicating a reception error is transmitted to the electronic board that had transmitted the user identification information received in step S13.

In step S16, a participant record is generated. Specifically, a participant record is generated by setting in its "conference identification information" field the conference identification information that is identical to the one set in the "conference identification information" field in the conference record extracted in step S15, and by setting in its "user identification information" field the user identification information that is identical to the one received in step S13. The generated participant record is stored additionally in participant table 97 stored in HDD 116 (step S17).

In step S19, as in step S01, it is determined whether a start instruction has been received. If a start instruction is received from the electronic board that is identical to the one that had transmitted the start instruction received in step S01, the process proceeds to step S22. Otherwise, the process proceeds to step S20. In step S22, the conference flag is set to "OFF", and the process returns to step S02. Specifically, conference table 91 stored in HDD 116 is searched using the device identification information of the electronic board that transmitted the start instruction in step S19, to extract a conference record that includes the relevant device identification information and has "ON" set in the "conference flag" field. Then, the "conference flag" field of the extracted conference record is set to "OFF". Step S22 is followed by step S02 and the subsequent processes, so that the electronic board that transmitted the start instruction in step S19 is specified in the next step S02, and conference identification information is generated in step S03, and in step S04, a new conference record including device identification information for the electronic board that transmitted the start instruction in step S19 is generated.

On the other hand, in step S20, it is determined whether an end signal has been received. If the end signal has been received from the electronic board that is identical to the one that had transmitted the start instruction received in step S01, the process proceeds to step S21; otherwise, the process returns to step S06.

In step S21, the conference flag is set to "OFF", and the process returns to step S01. Specifically, conference table 91 stored in HDD 116 is searched using the device identification information of the electronic board that had transmitted the end signal received in step S20, to extract a conference record that includes the relevant device identification information and has "ON" set in the "conference flag" field. Then, "OFF" is set in the "conference flag" field of the extracted conference record.

FIG. 14 is a flowchart illustrating an example of the flow of an image data output process. The image data output process is carried out by CPU 111 provided in MFP 100 as CPU 111 performs the image data management program. Referring to FIG. 14, CPU 111 determines whether a login operation has been accepted (step S31). CPU 111 is in a standby mode until it receives a login operation (NO in step S31), and once the login operation is accepted (YES in step S31), the process proceeds to step S32. In step S32, it is determined whether authentication has succeeded. If authentication has succeeded, the process proceeds to step S33; otherwise, the process proceeds to step S38. In step S38, an error message is displayed on display portion 114, and the process returns to step S31.

In step S33, a conference record is extracted. Specifically, participant table 97 stored in HDD 116 is searched using the user identification information of the user who has been authenticated successfully in step S32, to extract any participant record including the user identification information of the user who has been authenticated. In the following step S34, the conference identification information that is set in the "conference identification information" field of the conference record extracted in step S33 is displayed on display portion 114. In the case where a plurality of participant records have been extracted in step S33, the conference identification information included in each of the participant records is displayed. Here, the list display screen shown in FIG. 11 is displayed on display portion 114.

In the following step S35, it is determined whether at least one of the conference identification information displayed on display portion 114 has been selected. If the conference identification information has been selected, the process proceeds to step S36; otherwise, the process is terminated. In step S36, the data identification information associated with the conference identification information selected in step S35 is extracted. Specifically, image data table 95 stored in HDD 116 is searched using the conference identification information selected in step S35, to extract any image data record including the conference identification information selected in step S35. Then, the data identification information included in the extracted image data record is extracted.

Next, the image data specified by the extracted data identification information is printed (step S37). In the case where a plurality of image data records have been extracted in step S36 and, hence, a plurality of pieces of data identification information are extracted, then the images for the plurality of pieces of image data specified by the respective pieces of data identification information are printed.

Figure 15:
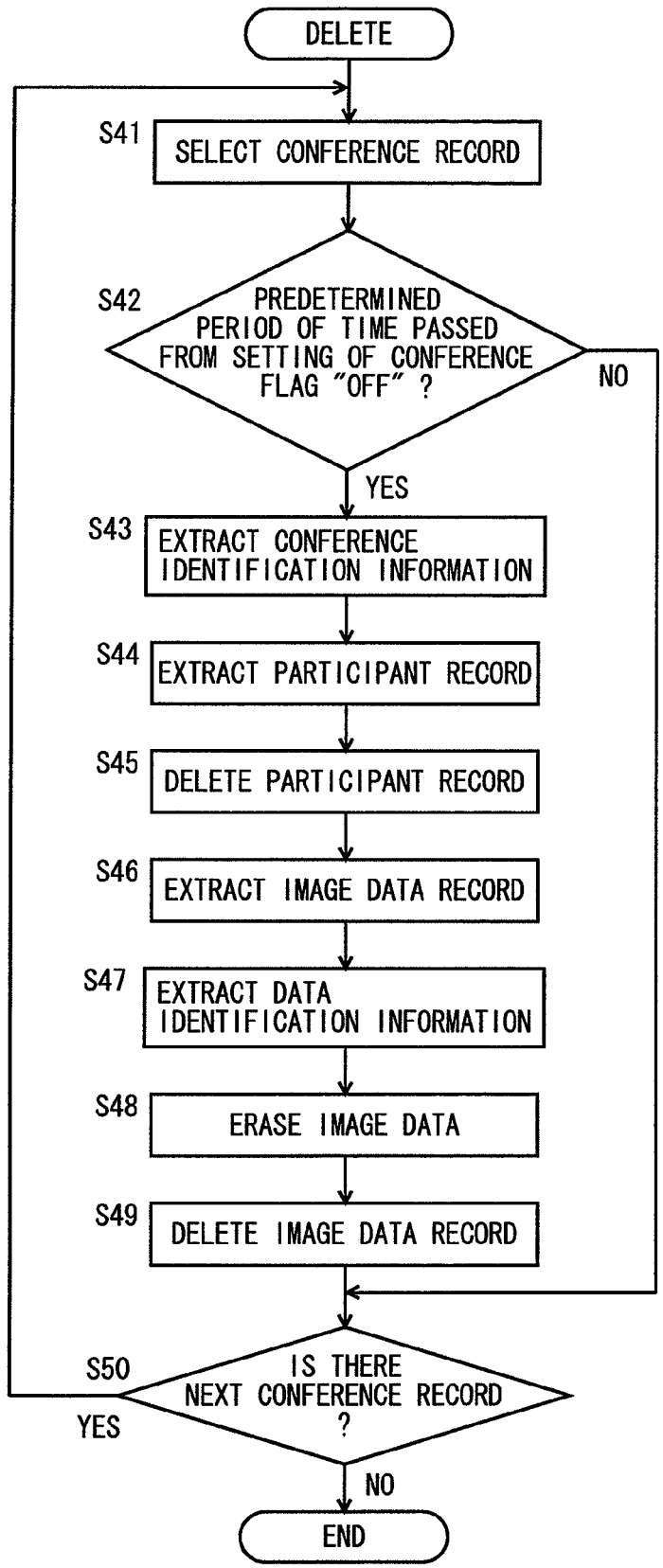
FIG. 15 is a flowchart illustrating an example of the flow of a delete process.

FIG. 15 is a flowchart illustrating an example of the flow of a delete process. The delete process is carried out by CPU 111 provided in MFP 100 as CPU 111 performs the image data management program. Referring to FIG. 15, CPU 111 selects one of the conference records included in conference table 91 stored in HDD 116 (step S41). It is then determined, for the selected conference record, whether a predetermined period of time has passed from when the conference flag has been set to "OFF" (step S42). If a predetermined period of time has passed therefrom, the process proceeds to step S43; otherwise, the process proceeds to step S50. In step S43, conference identification information is extracted. Specifically, the conference identification information included in the conference record selected in step S41 is extracted.

Next, from the participant records included in participant table 97 stored in HDD 116, any participant record including the conference identification information extracted in step S43 is extracted (step S44). The extracted participant record is deleted from participant table 97 (step S45). As a result, when the predetermined period of time has passed from the end of the conference, the participant record corresponding to the user who participated in the conference is deleted, and the record of the user who participated in the conference is erased. In the case where a plurality of participant records are extracted in step S44, the process in step S45 is performed for each of the plurality of participant records.

In the following step S46, any image data record including the conference identification information extracted in step S43 is extracted from the image data records included in image data table 95 stored in HDD 116. The data identification information included in the extracted image data record is extracted (step S47). Next, the image data specified by the extracted data identification information is erased from HDD 116 (step S48). As a result, when the predetermined period of time has passed from the end of the conference, the image data of the image drawn on the one of electronic boards 200, 200A, and 200B that was used in the conference is erased from HDD 116. This prevents the image from being stored in HDD 116 forever, which is advantageous particularly when the image used in the conference includes confidential matters. In the following step S49, the image data record extracted in step S46 is deleted from image data table 95, and the process proceeds to step S50. In the case where a plurality of image data records are extracted in step S46, the processes in steps S47 to S49 are performed for each of the plurality of image data records.

In step S50, it is determined whether there is another conference record yet to be processed. If there is an unselected conference record in conference table 91, it is determined that there is another conference record yet to be processed, and the process returns to step S41; otherwise, the process is terminated.

Second Embodiment

Figure 16:
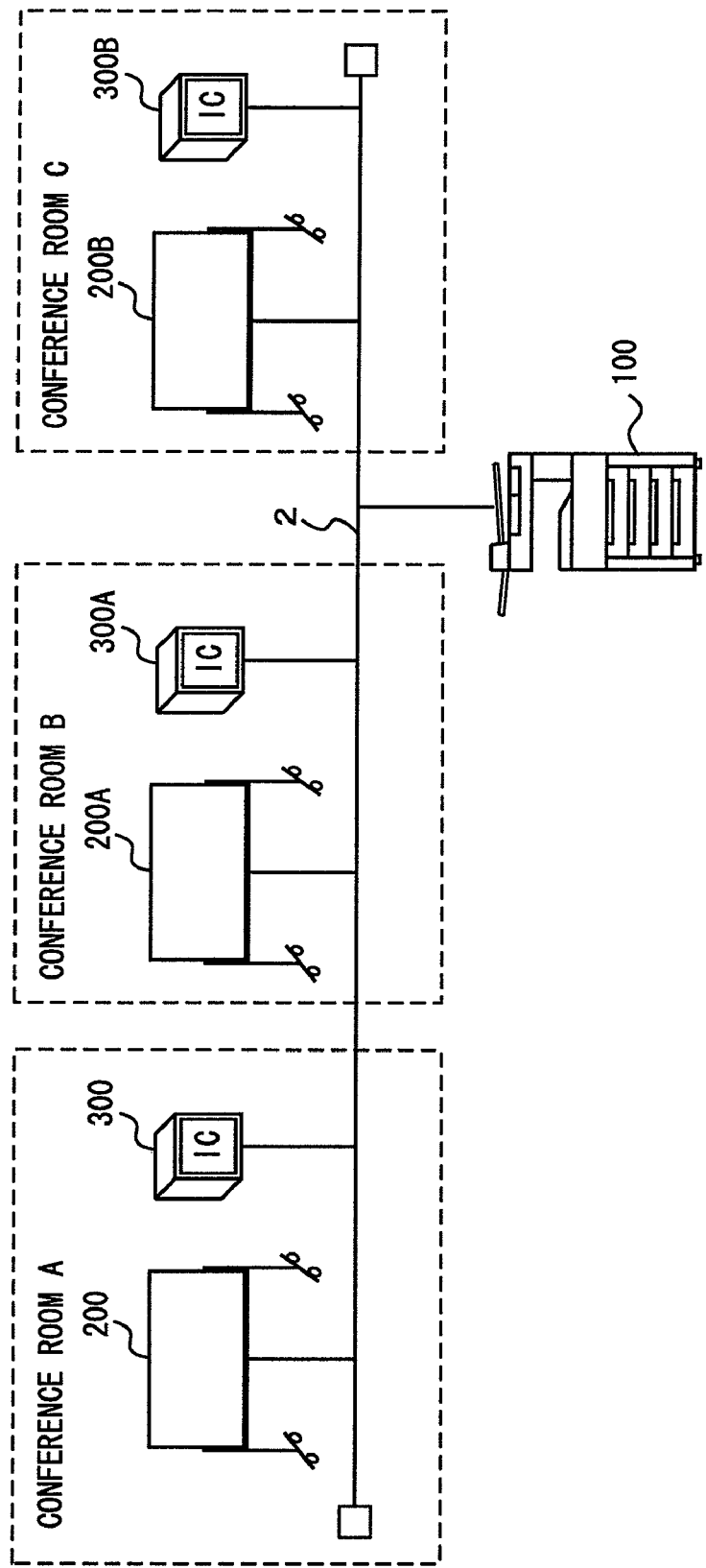
FIG. 16 schematically shows the conference system according to a second embodiment of the present invention.

FIG. 16 schematically shows the conference system according to a second embodiment of the present invention. Referring to FIG. 16, the conference system 1A of the second embodiment differs from conference system 1 of the first embodiment shown in FIG. 1 in that IC readers 300, 300A, and 300B are not connected to electronic boards 200, 200A, and 200B, but are connected to network 2. In the following, description will be made primarily about the differences from conference system 1 of the first embodiment.

FIG. 17 is a functional block diagram showing, by way of example, the functions of the IC reader according to the second embodiment. The functional block in FIG. 17 differs from the functional block shown in FIG. 5 in that communication I/F 307 has been replaced with a network I/F 307A. The other functions are similar to those in IC reader 300 shown in FIG. 5, and thus, description thereof will not be repeated here. Network I/F 307A is an interface for connecting IC reader 300 to network 2. IC reader 300 stores an IP address of MFP 100 in advance, and when IC card reading portion 303 reads user identification information from IC card 303A, IC reader 300 transmits the read user identification information to MFP 100 via network I/F 307A.

MFP 100 according to the second embodiment stores a device table in advance in HDD 116. The device table is for associating electronic boards 200, 200A, and 200B with IC readers 300, 300A, and 300B, respectively.

FIG. 18 is a functional block diagram showing, by way of example, the functions of a CPU provided in the MFP, together with data stored in the HDD, according to the second embodiment. The functions shown in FIG. 18 are implemented when CPU 111A provided in MFP 100 of the second embodiment carries out a program stored in memory card 119A or EEPROM 113. The functional block in FIG. 18 differs from the functional block shown in FIG. 7 in that user identification information receiving portion 65 and second extracting portion 67 in CPU 111 provided in MFP 100 of the first embodiment are replaced with a user identification information receiving portion 65A and a second extracting portion 67A in CPU 111A provided in MFP 100 of the second embodiment, and a device table 99 is stored in advance in HDD 116. The other functions are similar to those in CPU 111 provided in MFP 100 of the first embodiment, and thus, description thereof will not be repeated here.

FIG. 19 shows an example of the format of a device record included in a device table. Referring to FIG. 19, the device record includes the fields of "electronic board's device identification information" and "IC reader's device identification information". That is, the device table includes: a device record including the device identification information for electronic board 200 and the device identification information for IC reader 300, a device record including the device identification information for electronic board 200A and the device identification information for IC reader 300A, and a device record including the device identification information for electronic board 200B and the device identification information for IC reader 300B. With device table 99, electronic board 200 and IC reader 300, electronic board 200A and IC reader 300A, and electronic board 200B and IC reader 300B are associated with each other.

Returning to FIG. 18, user identification information receiving portion 65A controls data communication control portion 117 to receive user identification information from one of IC readers 300, 300A, and 300B. Upon receipt of the user identification information from one of IC readers 300, 300A, and 300B, user identification information receiving portion 65A outputs the user identification information to third associating portion 69, and outputs the device identification information for identifying the one of IC readers 300, 300A, and 300B that transmitted the user identification information, to second extracting portion 67A.

When the device identification information is input from user identification information receiving portion 65A, second extracting portion 67A searches device table 99 stored in HDD 116 using the relevant device identification information, to extract a device record in which the device identification information input from user identification information receiving portion 65A is set in the "IC reader's device identification information" field. Second extracting portion 67A then extracts the device identification information that is set in the "electronic board's device identification information" field in the extracted device record. Further, it searches conference table 91 stored in HDD 116 using the extracted device identification information for the electronic board, to extract a conference record that includes the relevant device identification information for the electronic board and has "ON" set in the "conference flag" field. Second extracting portion 67A outputs the conference identification information included in the extracted conference record, to third associating portion 69.

With device table 99, electronic boards 200, 200A, and 200B are associated with IC readers 300, 300A, and 300B, respectively. This makes it possible to determine which conference the user corresponding to the user identification information received from any of IC readers 300, 300A, and 300B is participating in, as in MFP 100 according to the first embodiment.

As described above, according to conference systems 1 and 1A of the above embodiments, each of electronic boards 200, 200A, and 200B reads characters or graphics drawn on the board surface and transmits image data to MFP 100. When receiving an operation instructing start of a conference, the electronic board transmits a start instruction to MFP 100. When any of IC readers 300, 300A, and 300B reads user identification information, the user identification information is transmitted to MFP 100.

When receiving a start instruction from one of electronic boards 200, 200A, and 200B, MFP 100 generates conference identification information, and stores a conference record in which the conference identification information is associated with device identification information for the electronic board that issued the start instruction. When receiving image data from one of electronic boards 200, 200A, and 200B, MFP 100 stores an image data record in which the image data is associated with conference identification information that has been lastly associated with the device identification information for the electronic board that transmitted the image data. Furthermore, when receiving user identification information from one of electronic boards 200, 200A, and 200B, or from one of IC readers 300, 300A, and 300B, MFP 100 stores participant identification information in which the user identification information is associated with conference identification information that has been lastly associated with the device identification information for the electronic board that transmitted the user identification information or with the device identification information for the electronic board that makes a pair with the IC reader that transmitted the user identification information. When a user is authenticated and logs in, MFP 100 extracts the conference identification information that is associated with the user identification information for the authenticated logged-in user, and extracts the image data associated with the conference identification information, to thereby form an image.

As described above, the image of the characters or graphics drawn on the board surface of the electronic board is formed on the condition that the user who has participated in the conference is authenticated. This allows the user who has participated in the conference to readily acquire the image of the characters or graphics drawn on the board surface of the electronic board. The image drawn on the board surface of the electronic board is not formed unless the user who has participated in the conference is authenticated. This ensures that the image drawn on the electronic board is printed only by the participants of the conference.

MFP 100 selectably displays, in the form of a list, the conference identification information associated with the user identification information for the authenticated logged-in user. This allows the user to select the conference that the user has participated in, to thereby select the image to be printed.

When MFP 100 receives a first start instruction from an electronic board, MFP 100 generates first conference identification information. Thereafter, when MFP 100 receives a second start instruction from the same electronic board, MFP 100 generates second conference identification information. Thus, even in the case where the same electronic board is used for a plurality of conferences, the conferences are identified as different conferences. This ensures that the images drawn on the board surface and the participants in the conferences are managed as the images drawn in the different conferences and the participants participating in the different conferences.

When a conference is over, MFP 100 sets the conference flag in the corresponding conference record to "OFF", and after a lapse of a predetermined period of time from when the conference flag was set to "OFF", MFP 100 deletes any participant record and any image data record including the conference identification information that is included in that conference record. It also erases the image data specified by the data identification information included in the deleted image data record. This prevents the history information of the participants in the conference as well as the images drawn on the electronic board during the conference from being stored in HDD 116 forever, and thus enables effective use of the storage resources. In the case where the image drawn on the electronic board includes confidential matters, erasing the image data itself ensures improved security.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A conference system including an electronic board and an image processing apparatus,
said electronic board comprising:
a reading portion to read characters or graphics drawn on a board surface of said electronic board;
a first transmitting portion to transmit image data obtained by reading said board surface to said image processing apparatus;
a start operation accepting portion to accept a start operation instructing start of a conference;
a second transmitting portion to transmit a start instruction to said image processing apparatus in response to the event that said start operation is accepted;
a user identification information acquiring portion to acquire user identification information; and
a third transmitting portion to transmit said acquired user identification information to said image processing apparatus,
said image processing apparatus comprising:

a conference identification information generating portion to generate conference identification information in response to reception of said start instruction from said electronic board;

a first associating portion to associate said generated conference identification information with device identification information for identifying said electronic board that transmitted said start instruction;

a second associating portion, when image data is received from said electronic board, to associate the received image data with said conference identification information that has been lastly associated with the device identification information for identifying said electronic board that transmitted the image data;

a third associating portion, when user identification information is received from said electronic board, to associate said received user identification information with said conference identification information that has been lastly associated with the device identification information for identifying said electronic board that transmitted said user identification information;

an authentication portion to authenticate a user;

a conference identification information extracting portion to extract conference identification information that is associated with user identification information for said authenticated user;

an image data extracting portion to extract image data that is associated with said extracted conference identification information; and an image output portion to output said extracted image data.

2. The conference system according to claim 1, wherein said image processing apparatus further comprises a display portion to display the conference identification information extracted by said conference identification information extracting portion.

3. The conference system according to claim 1, wherein after said conference identification information generating portion generates first conference identification information in response to reception of a first start instruction from said electronic board, when a second start instruction is received from said electronic board that transmitted said first start instruction, said conference identification information generating portion generates second conference identification information that is different from said first conference identification information.

4. The conference system according to claim 3, wherein said image processing apparatus further comprises a delete portion, in the case where said second conference identification information is generated by said conference identification information generating portion, to delete the user identification information and the image data associated with said first conference identification information after a lapse of a predetermined period of time from reception of said second start instruction.

5. The conference system according to claim 1, including a plurality of said electronic boards.

6. A conference system including an electronic board, a participant identifying apparatus, and an image processing apparatus, said electronic board comprising:

a reading portion to read characters or graphics drawn on a board surface of said electronic board;

a first transmitting portion to transmit image data obtained by reading said board surface to said image processing apparatus;

a start operation accepting portion to accept a start operation instructing start of a conference; and a second transmitting portion to transmit a start instruction to said image processing apparatus in response to the event that said start operation is accepted, said participant identifying apparatus comprising:

a user identification information acquiring portion to acquire user identification information; and a third transmitting portion to transmit said acquired user identification information to said image processing apparatus, said image processing apparatus comprising:

a storing portion to store, in advance, device information associating device identification information for said electronic board with device identification information for said participant identifying apparatus;

a conference identification information generating portion to generate conference identification information in response to reception of said start instruction from said electronic board;

a first associating portion to associate said generated conference identification information with device identification information for identifying said electronic board that transmitted said start instruction;

a second associating portion, when image data is received from said electronic board, to associate the received image data with said conference identification information that has been lastly associated with the device identification information for identifying said electronic board that transmitted the image data;

a third associating portion, when user identification information is received from said participant identifying apparatus, to associate said received user identification information with said conference identification information that has been lastly associated with the device identification information for said electronic board that is associated by said stored device information with the device identification information for said participant identifying apparatus that transmitted said user identification information;

an authentication portion to authenticate a user;

a conference identification information extracting portion to extract conference identification information that is associated with user identification information for said authenticated user;

an image data extracting portion to extract image data that is associated with said extracted conference identification information; and an image output portion to output said extracted image data.

7. The conference system according to claim 6, wherein said image processing apparatus further comprises a display portion to display the conference identification information extracted by said conference identification information extracting portion.

8. The conference system according to claim 6, wherein after said conference identification information generating portion generates first conference identification information in response to reception of a first start instruction from said electronic board, when a second start instruction is received from said electronic board that transmitted said first start instruction, said conference identification information generating portion generates second conference identification information that is different from said first conference identification information.

9. The conference system according to claim 8, wherein said image processing apparatus further comprises a delete portion, in the case where said second conference identification information is generated by said conference identification information generating portion, to delete the user identification information and the image data associated with said first conference identification information after a lapse of a predetermined period of time from reception of said second start instruction.

10. The conference system according to claim 6, including a plurality of said electronic boards and a plurality of said participant identifying apparatuses, wherein
   each of said plurality of electronic boards makes a pair with at least one of said plurality of participant identifying apparatuses, and
   said device information stored by said storing portion included in said image processing apparatus associates device identification information for each of said plurality of electronic boards with device identification information for the at least one of said plurality of participant identifying apparatuses that makes a pair with the electronic board.

11. An image data management method performed by an electronic board and an image processing apparatus which is communicable with the electronic board,
   the method causing said electronic board to perform the steps of:
   reading characters or graphics drawn on a board surface of said electronic board;
   transmitting image data obtained by reading said board surface to said image processing apparatus;
   accepting a start operation instructing start of a conference;
   transmitting a start instruction to said image processing apparatus in response to the event that said start operation is accepted;
   acquiring user identification information; and
   transmitting said acquired user identification information to said image processing apparatus,
   the method causing said image processing apparatus to perform the steps of:
   generating conference identification information in response to reception of said start instruction from said electronic board;
   associating said generated conference identification information with device identification information for identifying said electronic board that transmitted said start instruction;
   when image data is received from said electronic board, associating the received image data with said conference identification information that has been lastly associated with the device identification information for identifying said electronic board that transmitted the image data;
   when user identification information is received from said electronic board, associating said received user identification information with said conference identification information that has been lastly associated with the device identification information for identifying said electronic board that transmitted said user identification information;
   authenticating a user;
   extracting conference identification information that is associated with user identification information for said authenticated user;
   extracting image data that is associated with said extracted conference identification information; and
   outputting said extracted image data.

12. The image data management method according to claim 11, causing said image processing apparatus to further perform the step of displaying the conference identification information extracted in said step of extracting conference identification information.

13. The image data management method according to claim 11, wherein said step of generating conference identification information includes the steps of generating first conference identification information in response to reception of a first start instruction from said electronic board and, when a second start instruction is subsequently received from said electronic board that transmitted said first start instruction, generating second conference identification information that is different from said first conference identification information.

14. The image data management method according to claim 13, causing said image processing apparatus to further perform the step of, in the case where said second conference identification information is generated in said step of generating conference identification information, deleting the user identification information and the image data that are associated with said first conference identification information after a lapse of a predetermined period of time from reception of said second start instruction.

15. The image data management method according to claim 11, wherein said electronic board includes a plurality of said electronic boards.

16. An image data management method performed by an electronic board, a participant identifying apparatus, and an image processing apparatus, said image processing apparatus including a device storing portion to store, in advance, device information which associates device identification information for said electronic board with device identification information for said participant identifying apparatus,
   the method causing said electronic board to perform the steps of;
   reading characters or graphics drawn on a board surface of said electronic board;
   transmitting image data obtained by reading said board surface to said image processing apparatus;
   accepting a start operation instructing start of a conference; and
   transmitting a start instruction to said image processing apparatus in response to the event that said start operation is accepted,
   the method causing said participant identifying apparatus to perform the steps of;
   acquiring user identification information; and
   transmitting said acquired user identification information to said image processing apparatus,
   the method causing said image processing apparatus to perform the steps of:
   generating conference identification information in response to reception of said start instruction from said electronic board;
   associating said generated conference identification information with device identification information for identifying said electronic board that transmitted said start instruction;
   when image data is received from said electronic board, associating the received image data with said conference identification information that is associated with the device identification information for identifying said electronic board that transmitted the image data;
   when user identification information is received from said participant identifying apparatus, associating said received user identification information with said conference identification information that is associated with the device identification information for said electronic board that is associated by said stored device information with the device identification information for said participant identifying apparatus that transmitted said user identification information;

authenticating a user;

extracting conference identification information that is associated with user identification information for said authenticated user;

extracting image data that is associated with said extracted conference identification information; and outputting said extracted image data.

17. The image data management method according to claim 16, causing said image processing apparatus to further perform the step of displaying the conference identification information extracted in said step of extracting conference identification information.

18. The image data management method according to claim 16, wherein said step of generating conference identification information includes the steps of generating first conference identification information in response to reception of a first start instruction from said electronic board and, when a second start instruction is subsequently received from said electronic board that transmitted said first start instruction, generating second conference identification information that is different from said first conference identification information.

19. The image data management method according to claim 18, causing said image processing apparatus to further perform the step of, in the case where said second conference identification information is generated in said step of generating conference identification information, deleting the user identification information and the image data that are associated with said first conference identification information after a lapse of a predetermined period of time from reception of said second start instruction.

20. The image data management method according to claim 16, wherein said electronic board includes a plurality of said electronic boards and said participant identifying apparatus includes a plurality of said participant identifying apparatuses, each of said plurality of electronic boards makes a pair with at least one of said plurality of participant identifying apparatuses, and said device information stored by said device storing portion included in said image processing apparatus associates device identification information for each of said plurality of electronic boards with device identification information for the at least one of said plurality of participant identifying apparatuses that makes a pair with the electronic board.

\* \* \* \* \*